US012193000B2

(12) United States Patent
Falkenberg

(10) Patent No.: US 12,193,000 B2
(45) Date of Patent: Jan. 7, 2025

(54) BIDIRECTIONAL SIDELINK COMMUNICATIONS ENHANCEMENT

(71) Applicant: Toyota Jidosha Kabushiki Kaisha, Aichi-ken (JP)

(72) Inventor: Andreas Falkenberg, Escondido, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 558 days.

(21) Appl. No.: 17/449,434

(22) Filed: Sep. 29, 2021

(65) Prior Publication Data

US 2024/0064739 A1 Feb. 22, 2024

Related U.S. Application Data

(60) Provisional application No. 63/085,577, filed on Sep. 30, 2020.

(51) Int. Cl.
*H04W 72/20* (2023.01)
*H04W 72/40* (2023.01)

(52) U.S. Cl.
CPC ........... *H04W 72/20* (2023.01); *H04W 72/40* (2023.01)

(58) Field of Classification Search
CPC .............................. H04W 72/20; H04W 72/40
See application file for complete search history.

(56) References Cited

U.S. PATENT DOCUMENTS

2019/0141742 A1* 5/2019 Zhou ..................... H04L 5/0064
2022/0232542 A1* 7/2022 Back .................... H04W 72/044
2022/0338293 A1* 10/2022 Yu ......................... H04W 76/20

OTHER PUBLICATIONS

ETSI TS 138 211, "Technical Specification: Physical channels and modulation", 3GPP TS 38.211 version 16.2.0, Release 16, Jul. 2020, 136 pages, downloadable from http://www.etsi.org/standards-search.

* cited by examiner

*Primary Examiner* — Michael A Keller
(74) *Attorney, Agent, or Firm* — Finnegan, Henderson, Farabow, Garrett and Dunner, LLP

(57) ABSTRACT

A system, method and apparatus for mobile communications including sidelink transmissions is provided. A user equipment (UE) receives configuration parameters of a cell for sidelink communications with a second UE that includes configuration parameters for a first bandwidth part (BWP) and a second BWP of the cell. The first configuration parameters indicate first radio resources of the cell and a first numerology for the first BWP. The second configuration parameters indicate second radio resources of the cell and a second numerology for the second BWP. The UE transmits the one or more first sidelink signals and channels via the first BWP and based on the first configuration parameters. The UE then receives one or more second sidelink signals and channels via the second BWP and based on the second configuration parameters.

22 Claims, 19 Drawing Sheets

| Transport channel / Logical channel | BCH | PCH | DL-SCH |
|---|---|---|---|
| BCCH | X | | |
| PCCH | | X | |
| CCCH | | | X |
| DCCH | | | X |
| DTCH | | | X |

FIG. 3A

| Transport channel / Logical channel | UL-SCH | RACH |
|---|---|---|
| CCCH | X | |
| DCCH | X | |
| DTCH | X | |

FIG. 3B

| Transport channel / Logical channel | SL-BCH | SL-SCH |
|---|---|---|
| SBCCH | X | |
| SCCH | | X |
| STCH | | X |

FIG. 3C

| Physical channel | PDSCH | PDCCH | PBCH |
|---|---|---|---|
| Transport channel | | | |
| BCH | | | X |
| PCH | X | | |
| DL-SCH | X | | |

FIG. 4A

| Physical channel | PUSCH | PUCCH | PRACH |
|---|---|---|---|
| Transport channel | | | |
| UL-SCH | X | | |
| RACH | | | X |

FIG. 4B

| Physical channel | PSSCH | PSCCH | PSFCH | PSBCH |
|---|---|---|---|---|
| Transport channel | | | | |
| SL-BCH | | | | X |
| SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

```
SL-BWP-Config ::=    SEQUENCE (
    sl-BWP-Id                BWP-Id,
    sl-BWP-Generic           SL-BWP-Generic
    sl-BWP-direction         CHOICE (Tx, Rx)
    sl-BWP-priority          INTEGER (1..8)
    ...
}
```

FIG. 17

BIDIRECTIONAL SIDELINK COMMUNICATIONS ENHANCEMENT

CROSS-REFERENCE TO RELATED APPLICATION

This application claims the benefit of U.S. Provisional Application No. 63/085,577, entitled BIDIRECTIONAL SIDELINK COMMUNICATIONS ENHANCEMENT, and filed on Sep. 30, 2020. U.S. Provisional Application No. 63/085,577 is incorporated by reference herein.

BACKGROUND

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

FIG. 17 shows an example sidelink bandwidth part information element according to some aspects of some of various exemplary embodiments of the present disclosure.

DETAILED DESCRIPTION

Figure 1:
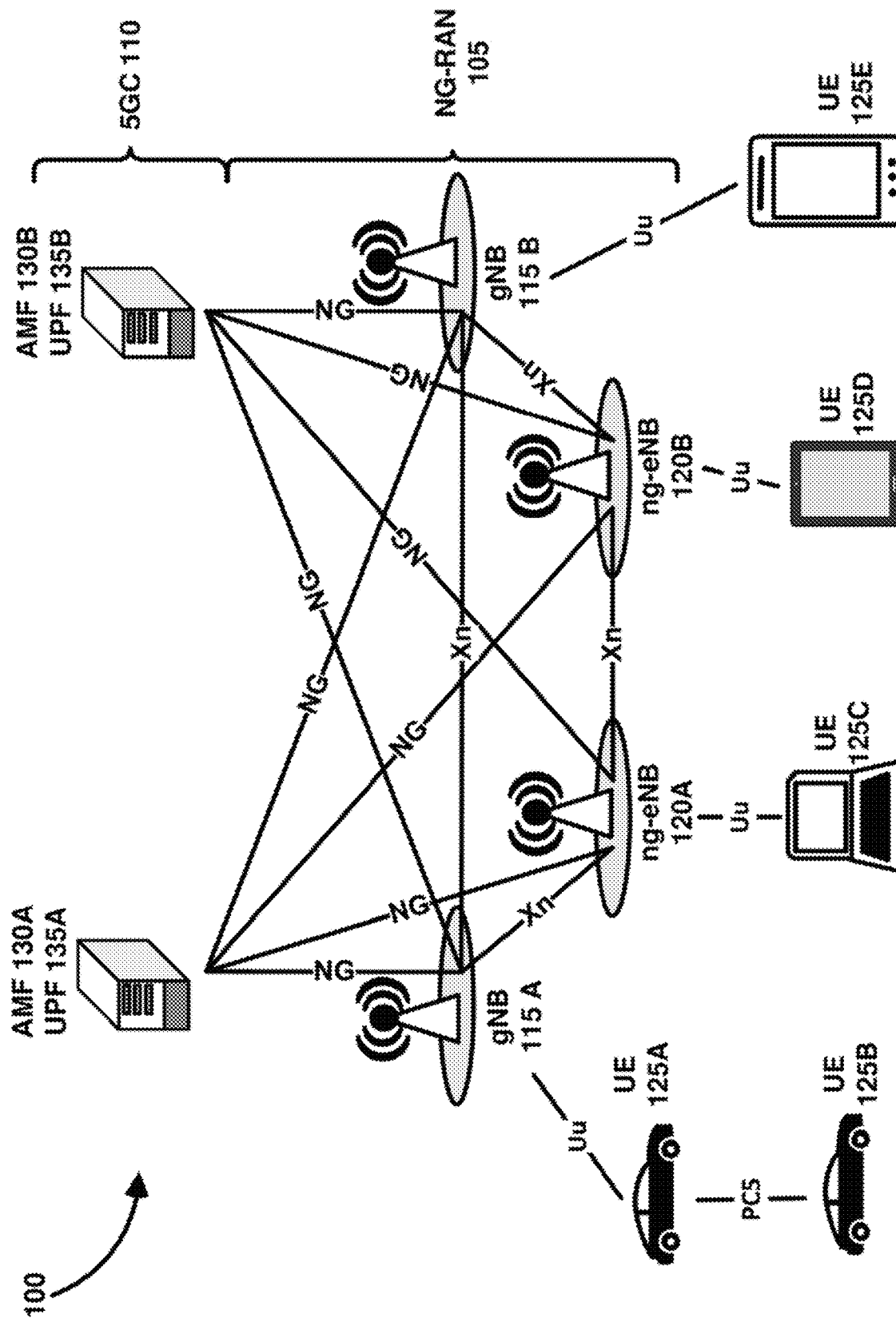
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (JOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (HOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc. Still further, UEs 125 may also include components or subcomponents integrated into other devices, such as vehicles, to provide wireless communication functionality with nodes in the RAN as described herein. Such other devices may have other functionality or multiple functionalities in addition to wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing 86 forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
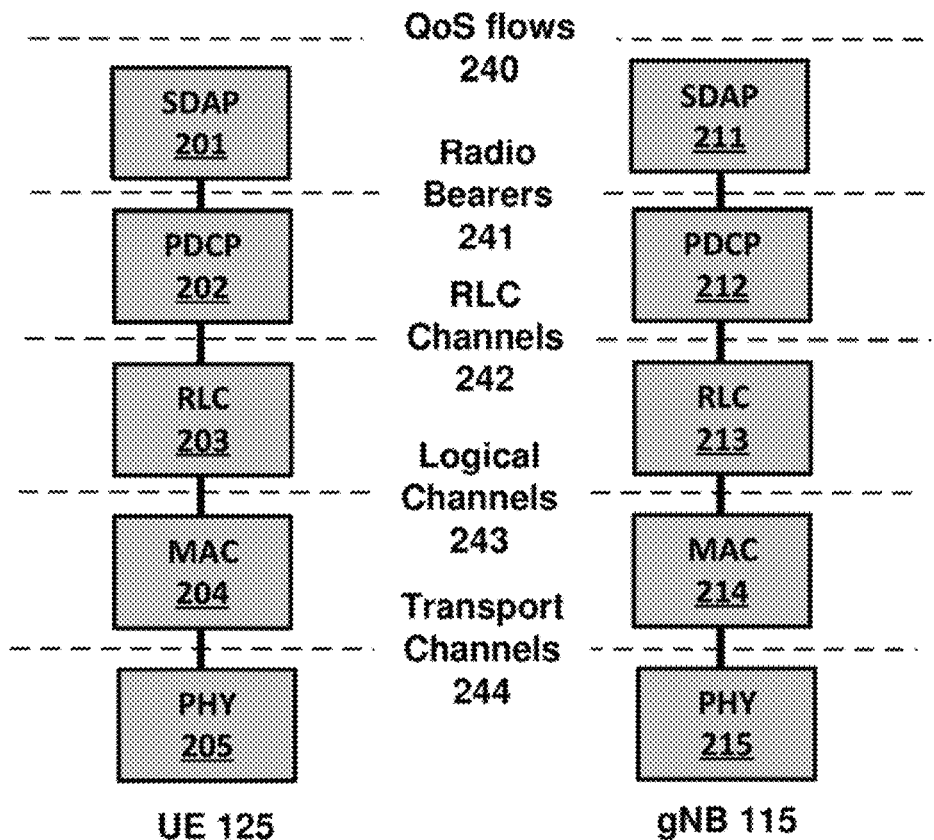
FIG. 2A and FIG. 2B show examples of radio protocol stacks for user plane and control plane, respectively, according to some aspects of some of various exemplary embodiments of the present disclosure.
Figure 2B:
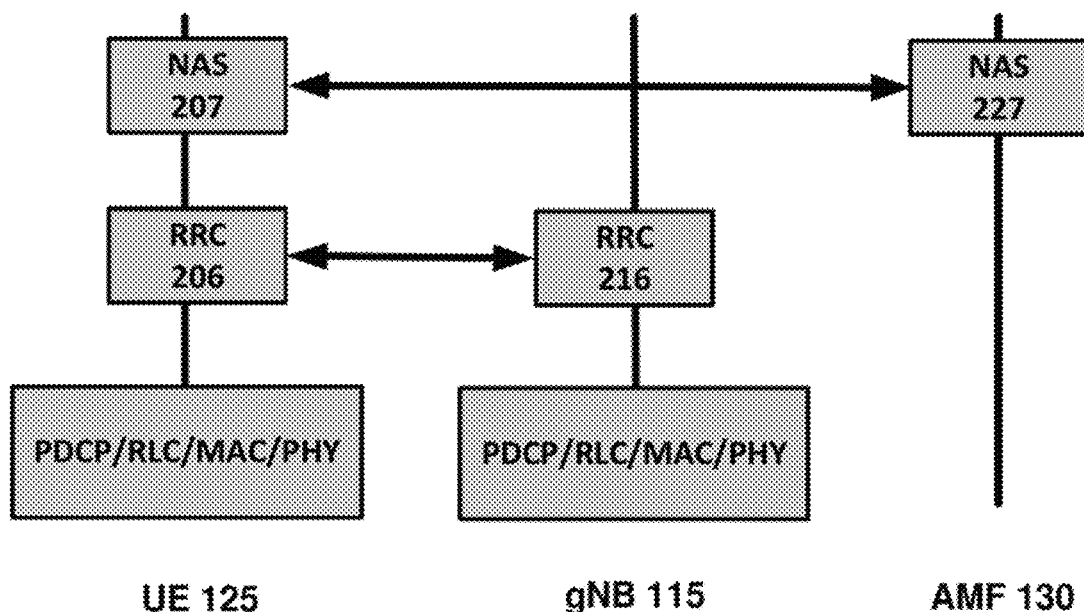

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by:

fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may be mapped to the PSCCH.

Figure 5A:
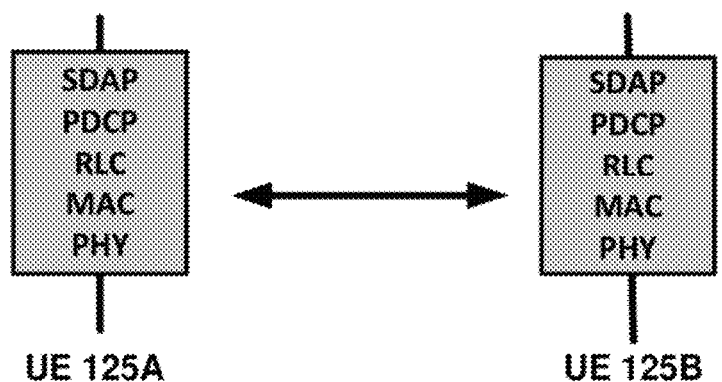
FIG. 5A, FIG. 5B, FIG. 5C and FIG. 5D show examples of radio protocol stacks for NR sidelink communication according to some aspects of some of various exemplary embodiments of the present disclosure.
Figure 5B:
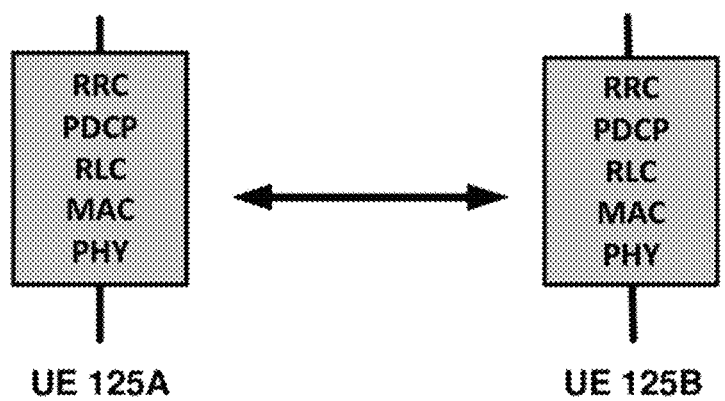
Figure 5C:
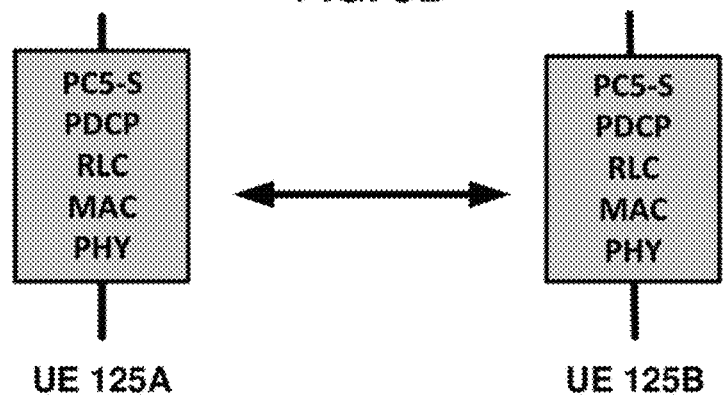
Figure 5D:
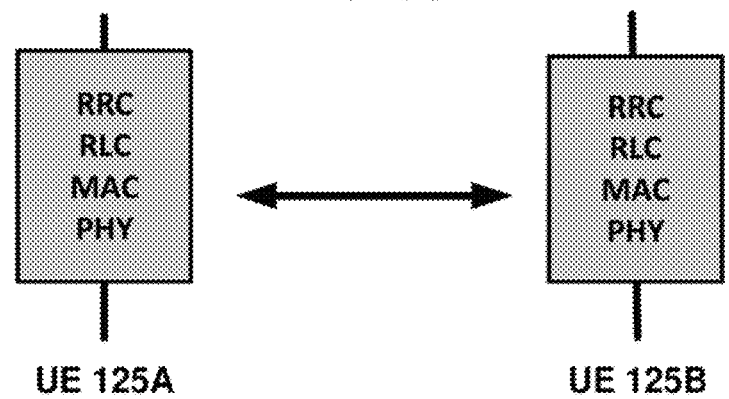

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
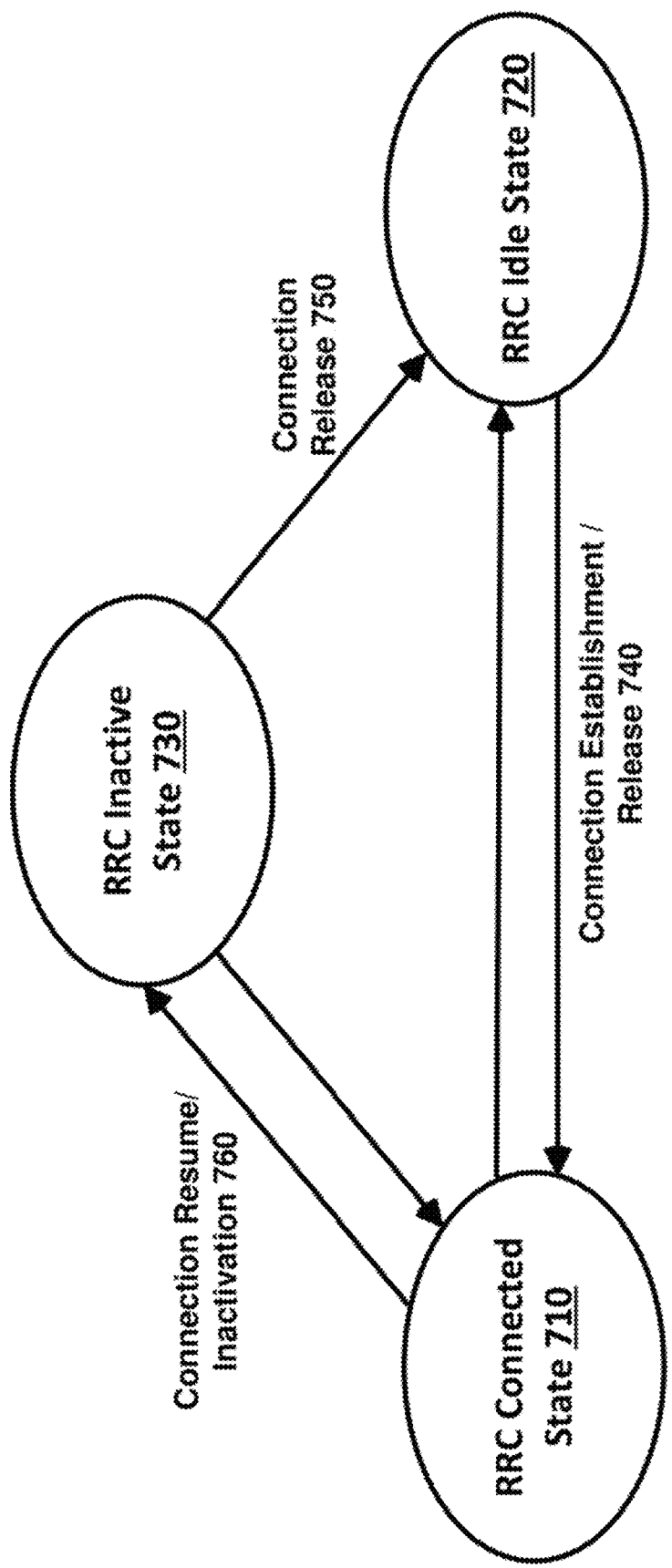
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
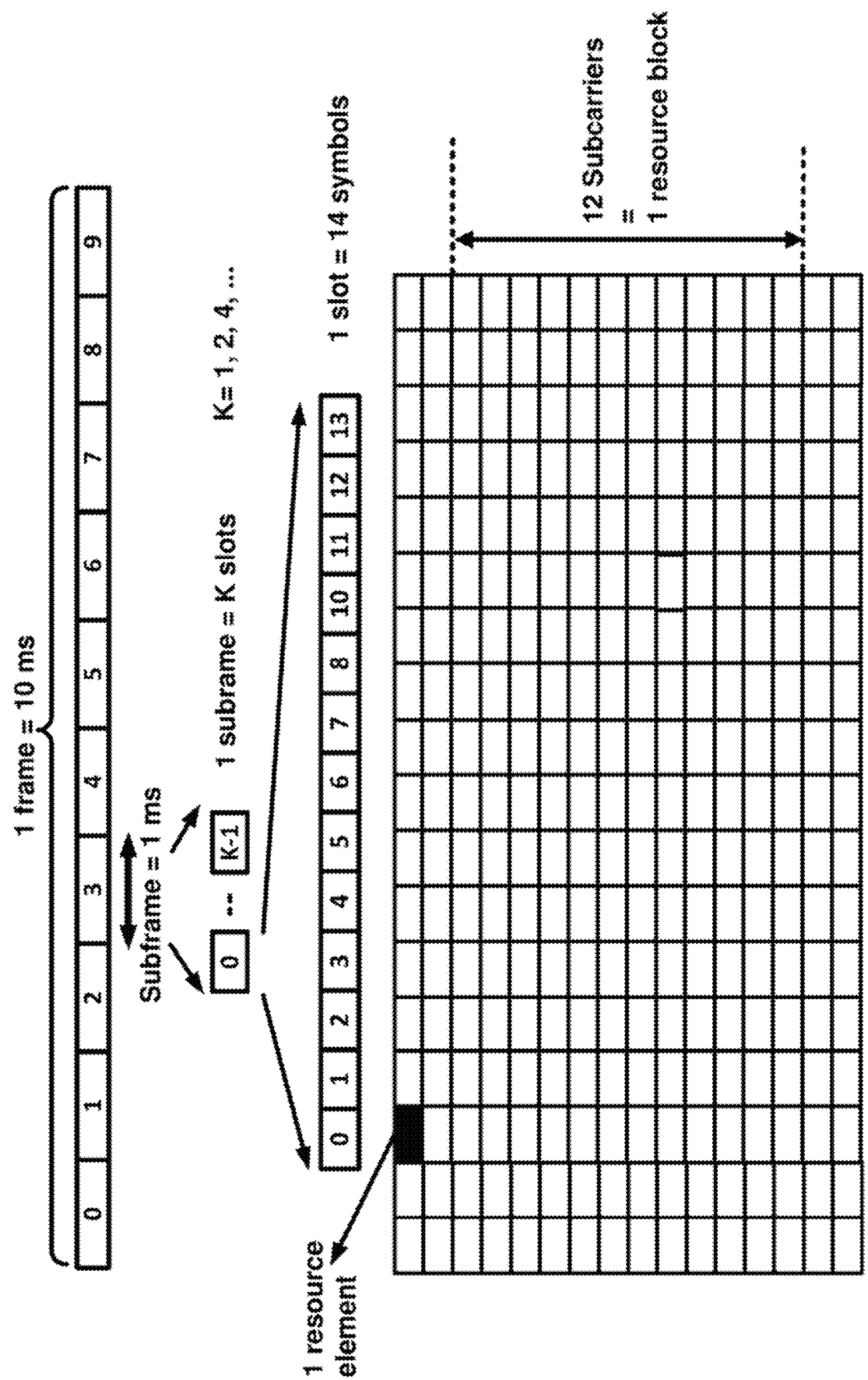
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
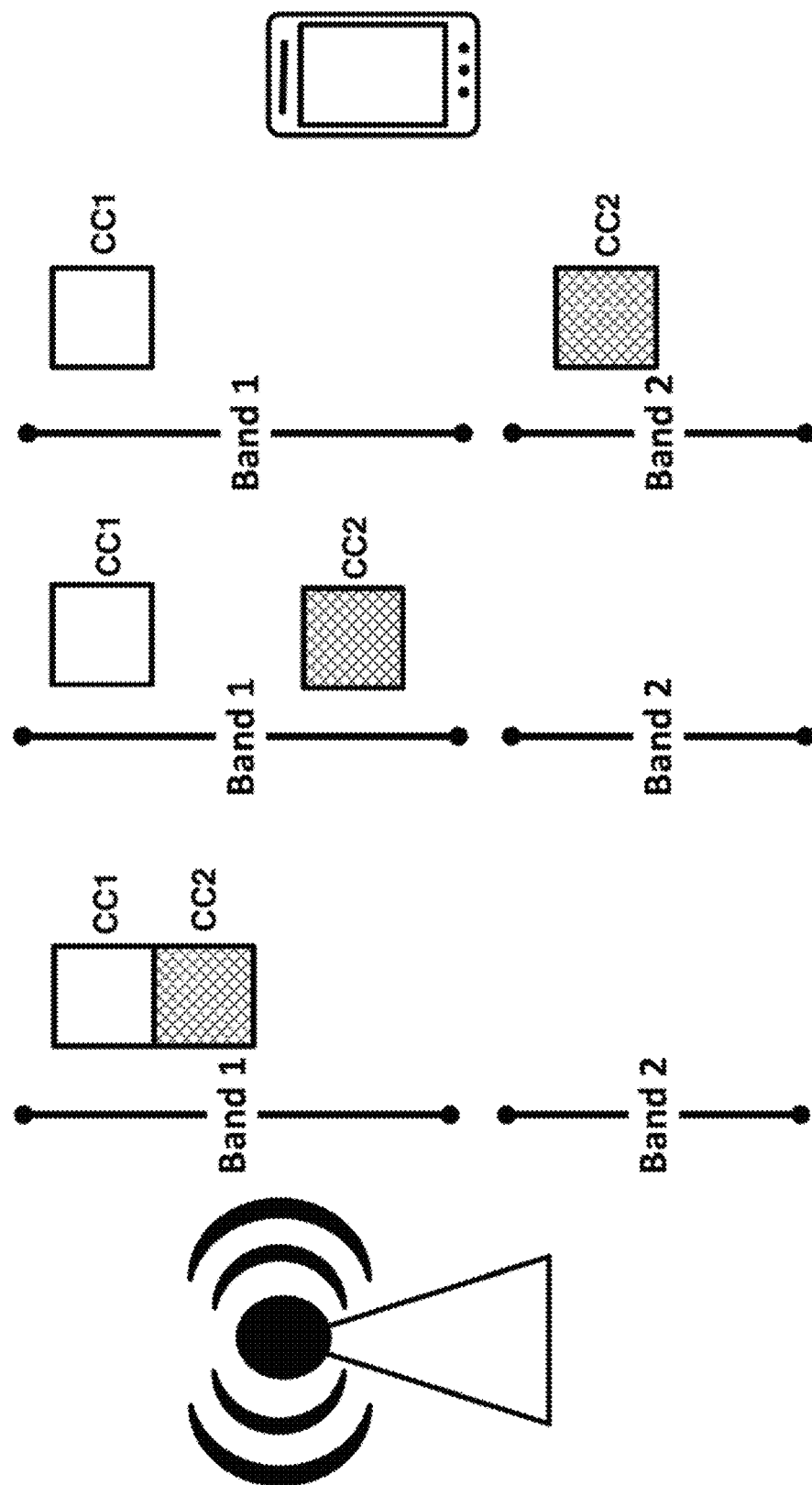
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
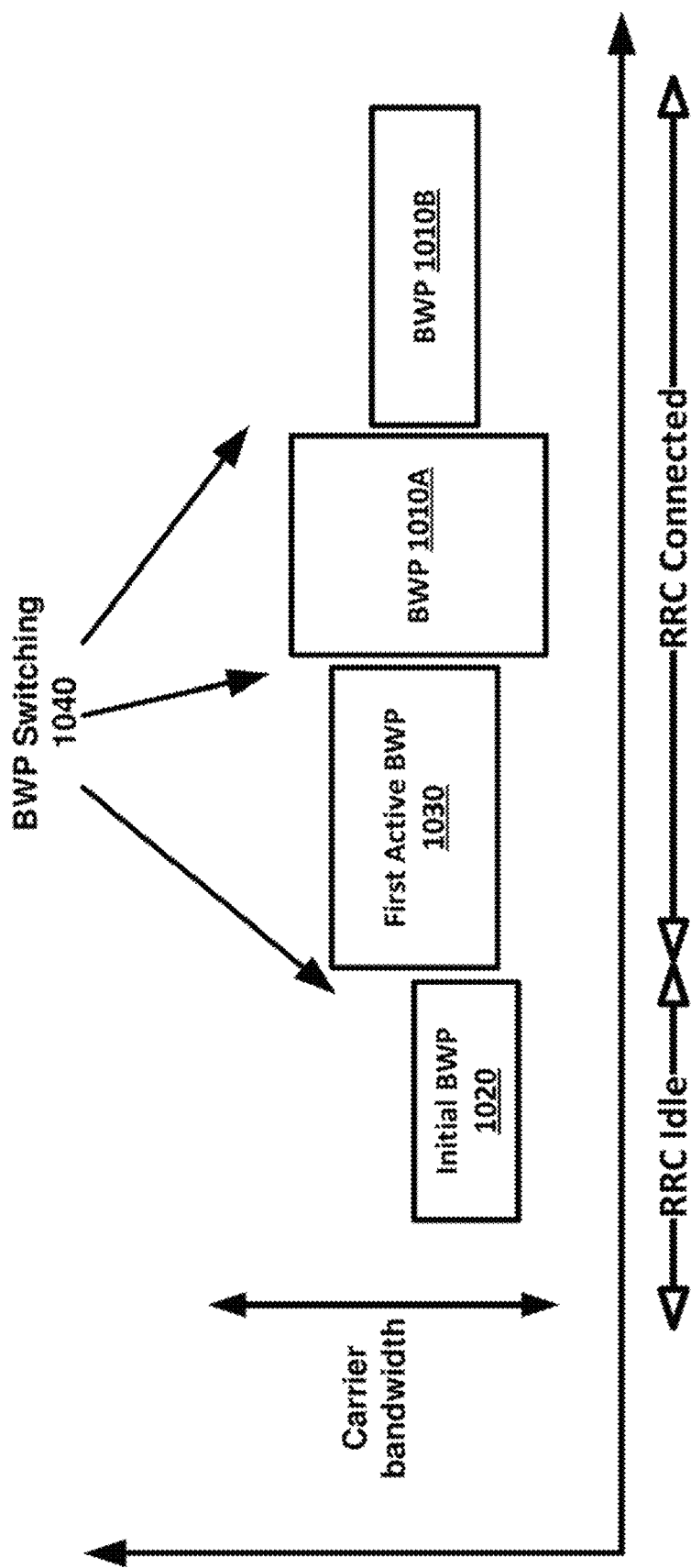
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-) configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
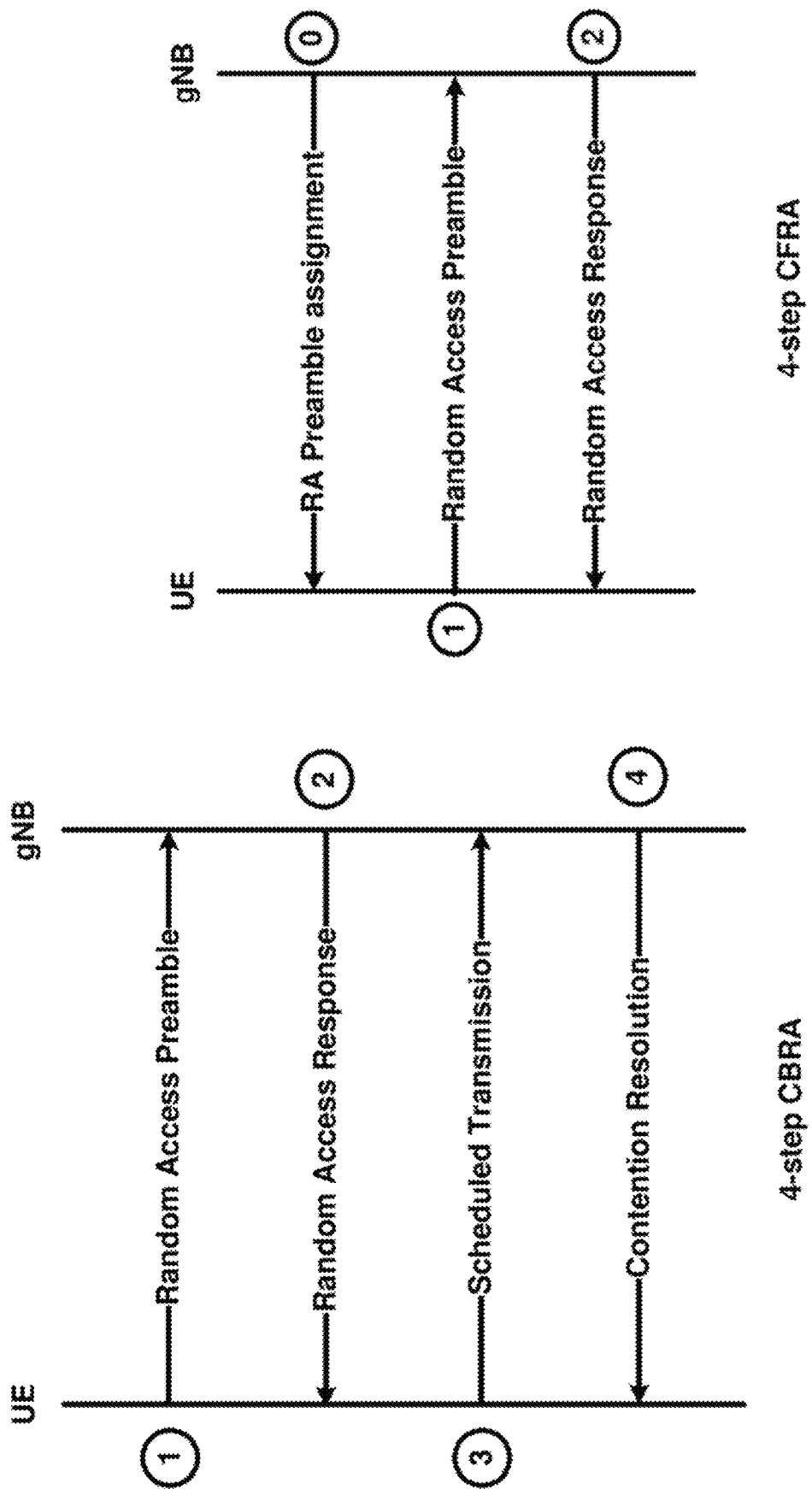
FIG. 11 shows example four-step contention-based and contention-free random access processes according to some aspects of some of various exemplary embodiments of the present disclosure.
Figure 12:
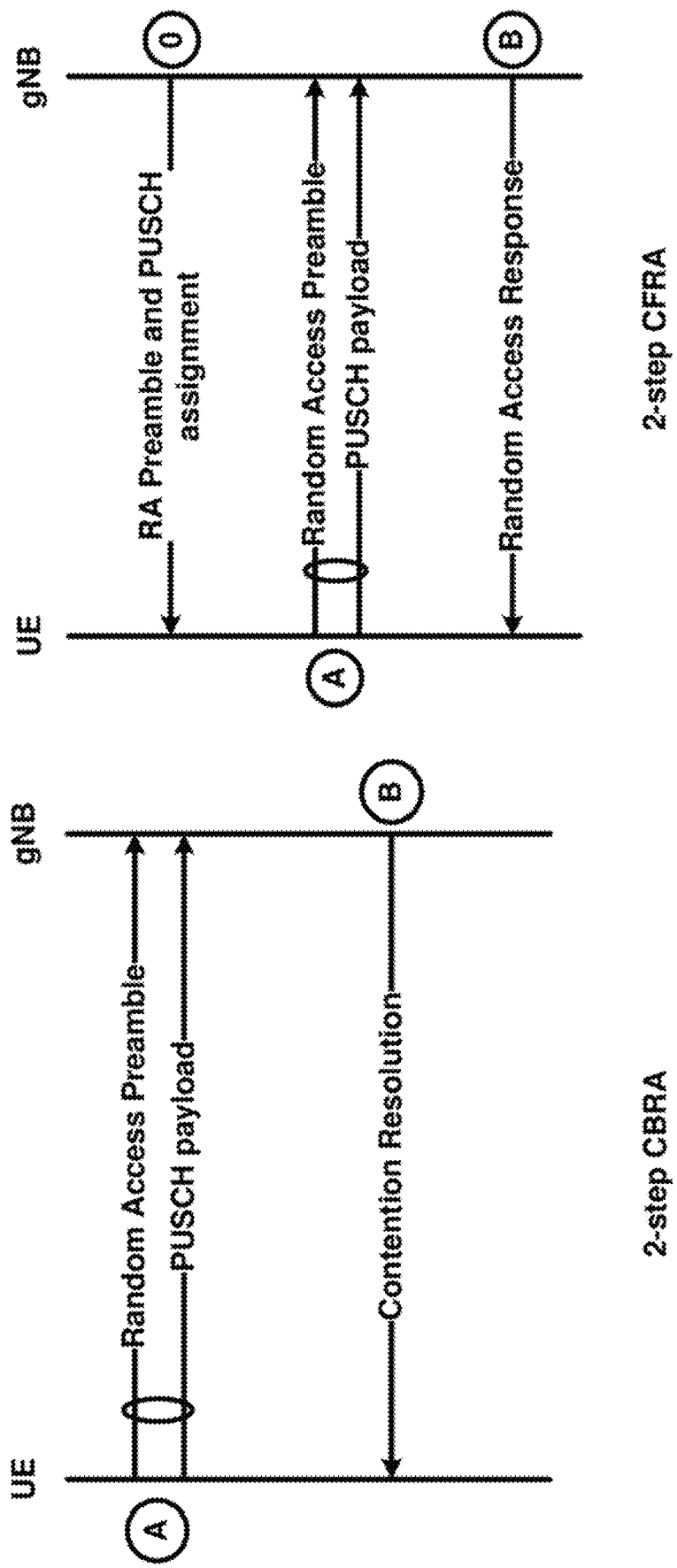
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re)transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
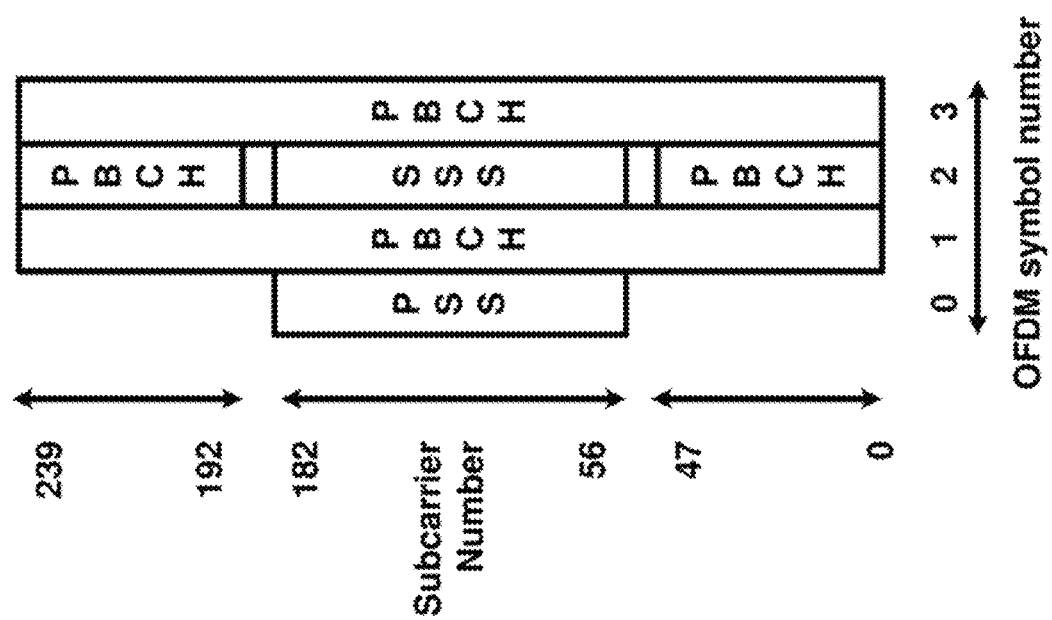
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e. using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBS) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
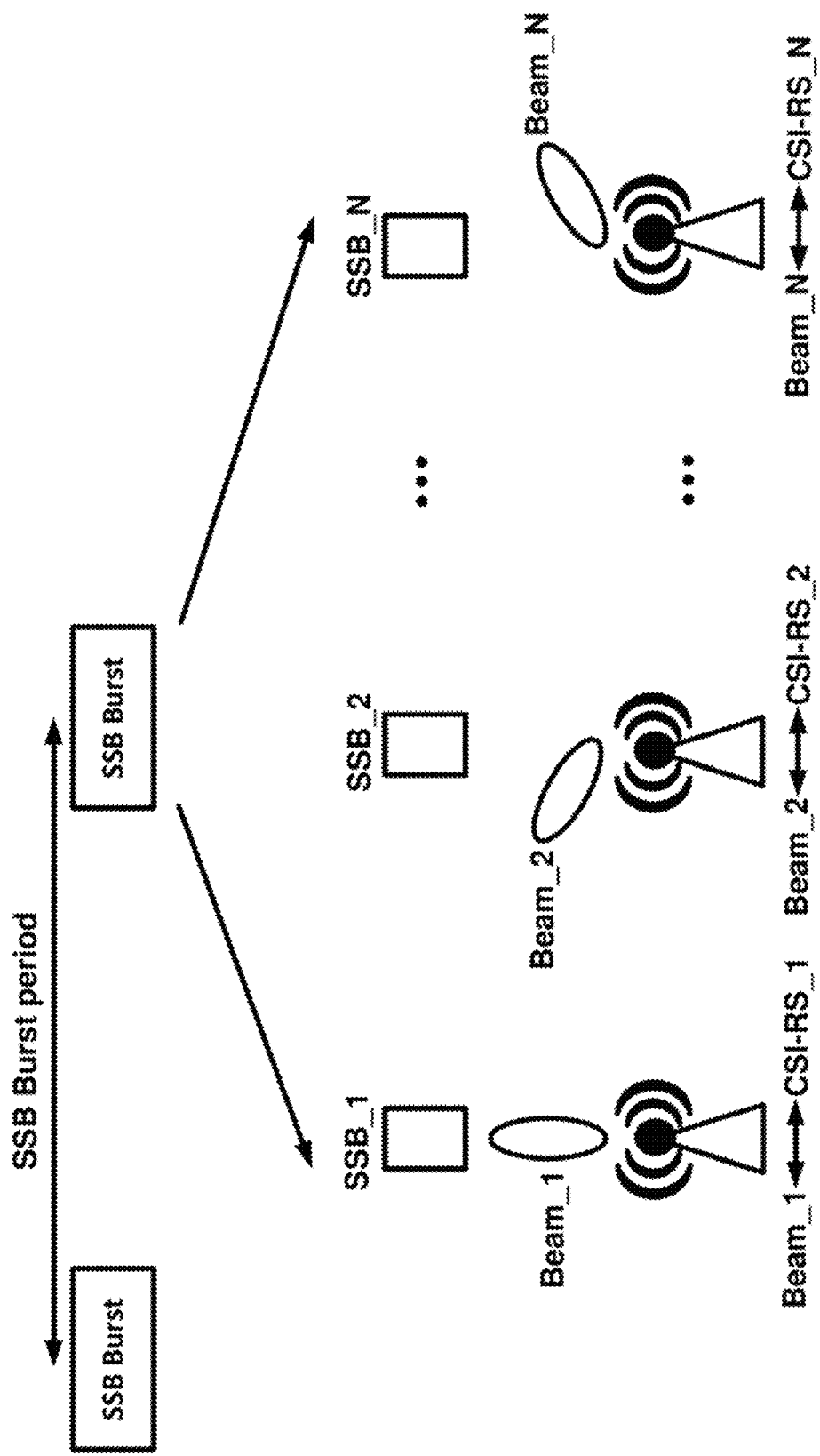
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
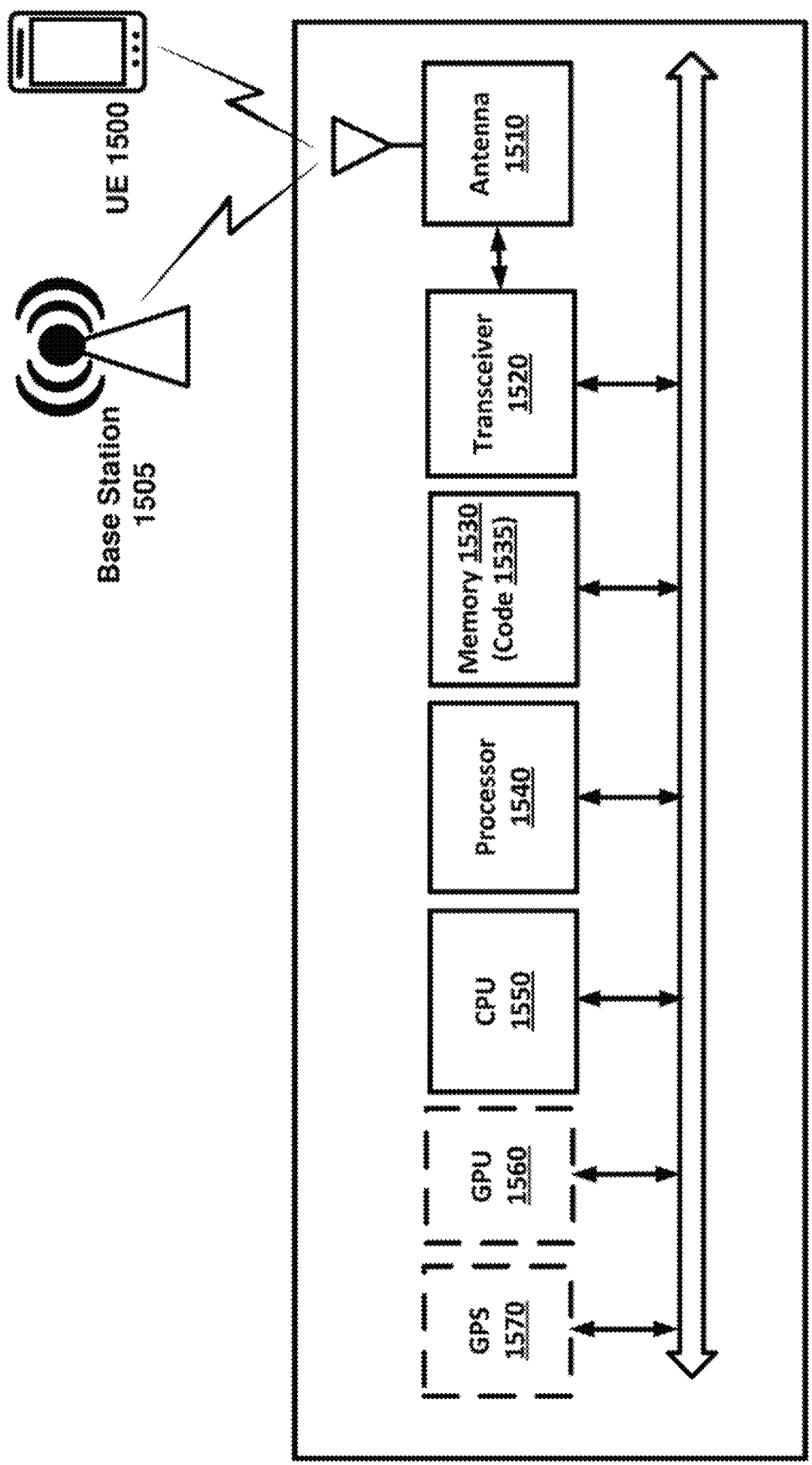
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment 1500. Accordingly, the components illustrated in FIG. 15 are not necessarily limited to either a user equipment or base station.

The Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

In some examples, for each numerology and carrier, a resource grid of $N_{grid,x}^{size,\mu} N_{sc}^{RB}$ subcarriers and $N_{symb}^{subframe,\mu}$ OFDM symbols may be defined, starting at common resource block $N_{grid}^{start,\mu}$ indicated by higher-layer (e.g., RRC) signaling. In some examples, there may be one set of resource grids per transmission direction (uplink, downlink, or sidelink) with the subscript x set to DL, UL, and SL for downlink, uplink, and sidelink, respectively. In some examples, there may be one resource grid for a given antenna port p, subcarrier spacing configuration μ, and transmission direction (downlink, uplink, or sidelink).

In some examples, for uplink and downlink, the carrier bandwidth $N_{grid}^{size,\mu}$ for subcarrier spacing configuration μ may be given by a higher-layer (e.g., RRC) parameter (e.g., carrierBandwidth) in the SCS-SpecificCarrier IE. The starting position $N_{grid}^{start,\mu}$ for subcarrier spacing configuration μ may be given by a higher-layer (e.g., RRC) parameter (e.g., offsetToCarrier) in an information element (e.g., SCS-SpecificCarrier IE). In some examples, the frequency location of a subcarrier may refer to the center frequency of that subcarrier.

In some examples, for the downlink, the higher-layer parameter txDirectCurrentLocation in the SCS-SpecificCarrier IE may indicate the location of the transmitter DC subcarrier in the downlink for each of the numerologies configured in the downlink.

In an example, for the uplink, the higher-layer parameter txDirectCurrentLocation in the UplinkTxDirectCurrentBWP IE may indicate the location of the transmitter DC subcarrier in the uplink for each of the configured bandwidth parts, including whether the DC subcarrier location is offset by 7.5 kHz relative to the center of the indicated subcarrier or not.

In some examples, each element in the resource grid for antenna port p and subcarrier spacing configuration μ may be called a resource element and may be uniquely identified by $(k, l)_{p,\mu}$ where k may be the index in the frequency domain and l may refer to the symbol position in the time domain relative to some reference point. Resource element $(k, l)_{p,\mu}$ may correspond to a physical resource and the complex value $a_{k,l}^{(p,\mu)}$. In some examples, a resource block may be defined as $N_{sc}^{RB}=12$ consecutive subcarriers in the frequency domain.

In some examples, a Point A may serve as a common reference point for resource block grids and may be obtained based on higher layer (e.g., RRC) parameter, for example: offsetToPointA for a PCell downlink where offsetToPointA may represent the frequency offset between point A and the lowest subcarrier of the lowest resource block, which has the subcarrier spacing provided by the higher-layer parameter subCarrierSpacingCommon and overlaps with the SS/PBCH block used by the UE for initial cell selection, expressed in units of resource blocks assuming 15 kHz subcarrier spacing for FR1 and 60 kHz subcarrier spacing for FR2; absolute-FrequencyPointA for all other cases where absoluteFrequencyPointA may represent the frequency-location of point A.

In some examples, common resource blocks may be numbered from 0 and upwards in the frequency domain for subcarrier spacing configuration μt. The center of subcarrier 0 of common resource block 0 for subcarrier spacing configuration μ may coincide with 'point A'. The relation between the common resource block number $n_{CRB}^\mu$ in the frequency domain and resource elements (k, l) for subcarrier spacing configuration μ may be given $$byn_{CRB}^\mu = \left\lfloor \frac{k}{N_{sc}^{RB}} \right\rfloor,$$

where k may be defined relative to point A such that k=0 may correspond to the subcarrier centered around point A.

In some examples, physical resource blocks for subcarrier spacing configuration μ may be defined within a bandwidth part and numbered from 0 to $N_{BWP,i}^{size,\mu}-1$ where i may be the number of the bandwidth part. The relation between the physical resource block $n_{PRB}^\mu$ in bandwidth part i and the common resource block $n_{CRB}^\mu$ may be given by $n_{CRB}^\mu = n_{PRB}^\mu + N_{BWP,i}^{start,\mu}$, where $N_{BWP,i}^{start,\mu}$ may be the common resource block where bandwidth part i may start relative to common resource block 0.

In some examples, a bandwidth part may be a subset of contiguous common resource blocks for a given numerology $\mu_i$ in bandwidth part i on a given carrier. The starting position $N_{BWP,i}^{start,\mu}$ and the number of resource blocks $N_{BWP,i}^{size,\mu}$ in a bandwidth part may fulfill $N_{grid,x}^{start,\mu} \leq N_{BWP,i}^{start,\mu} < N_{grid,x}^{start,\mu} + N_{grid,x}^{size,\mu}$ and $N_{grid,x}^{start,\mu} < N_{BWP,i}^{start,\mu} + N_{BWP,i}^{size,\mu} \leq N_{grid,x}^{start,\mu} + N_{grid,x}^{size,\mu}$, respectively.

In some examples, a UE can be configured with up to a first number of (e.g. four) bandwidth parts in the downlink. In some examples, one downlink bandwidth part may be active at a given time. In some examples, a UE may be configured with up to a second number of (e.g., four) bandwidth parts in the uplink. In some examples, one uplink bandwidth part may be active at a given time. If a UE is configured with a supplementary uplink, the UE may be, in addition, configured with up to the second number of bandwidth parts in the supplementary uplink and one supplementary uplink bandwidth part may be active at a given time. In some examples, the UE may not transmit PUSCH or PUCCH outside an active bandwidth part. For an active cell, the UE may not transmit SRS outside an active bandwidth part.

In some examples, for sidelink, the carrier bandwidth $N_{grid}^{size,\mu}$ for subcarrier spacing configuration μ provided by the higher-layer parameter subcarrierSpacing-SL may be given by a higher-layer parameter (e.g., carrierBandwidth-SL). The starting position $N_{grid}^{start,\mu}$ for subcarrier spacing configuration μ may be given by a higher-layer parameter (e.g., offsetToCarrier-SL).

In some examples, for the sidelink, a higher-layer parameter (e.g., txDirectCurrentLocation-SL) in an IE (e.g., the SidelinkTxDirectCurrentBWP IE) may indicate the location of the transmitter DC subcarrier in the sidelink for each of the configured bandwidth parts.

In some examples, the Point A for sidelink transmission/reception may be obtained from a higher-layer (e.g., RRC) parameter (e.g., absoluteFrequencyPointA-SL).

In some examples, a UE may be provided by an RRC parameter (e.g., locationAndBandwidth-SL) a BWP for SL transmissions (e.g., SL BWP) associated with a numerology and resource grid. For a resource pool within the SL BWP, the UE may be provided by an RRC parameter (e.g., numSubchannel) a number of sub-channels where each sub-channel may include a number of contiguous RBs provided by an RRC parameter (e.g., subchannelsize). The first RB of the first sub-channel in the SL BWP may be indicated by an RRC parameter (e.g., startRB-Subchannel). In some examples, available slots for a resource pool may be provided by an RRC parameter (e.g., timeresourcepool) and may occur with a periodicity provided by an RRC parameter (e.g., periodResourcePool). In some examples, for an available slot without S-SS/PSBCH blocks, SL transmissions may start from a first symbol indicated by an RRC parameter (e.g., startSLsymbols) and be within a number of consecutive symbols indicated by lengthSLsymbols. In some examples, for an available slot with S-SS/PSBCH blocks, the first symbol and the number of consecutive symbols may be predetermined.

In some examples, the UE may expect to use a same numerology in the SL BWP and in an active UL BWP in a same carrier of a same cell. If the active UL BWP numerology is different than the SL BWP numerology, the SL BWP may be deactivated.

In some examples, a UE transmitting using a Mode-1 grant may use the corresponding fields in SCI to reserve the next resource(s) allocated by the same grant.

In some examples, if a UE would simultaneously transmit on the UL and on the SL of a serving cell, and the UE is not capable of simultaneous transmissions on the UL and on the SL of the serving cell, the UE may transmit only on the link, UL or SL, with the higher priority.

In some examples, if a UE is capable of simultaneous transmissions on the UL and on the SL of two respective carriers of a serving cell, or of two respective serving cells, the UE may transmit on the UL and on the SL of the two respective carriers of the serving cell, or of the two respective serving cells, the transmission on the UL may overlap with the transmission on the SL over a time period, and the total UE transmission power over the time period may exceed $P_{CMAX}$.

In some examples, the UE may reduce the power for the UL transmission prior to the start of the UL transmission, if the SL transmission has higher priority than the UL transmission, so that the total UE transmission power may not exceed $P_{CMAX}$. The UE may reduce the power for the SL transmission prior to the start of the SL transmission, if the UL transmission has higher priority than the SL transmission, so that the total UE transmission power may not exceed $P_{CMAX}$.

In some examples, a UE may perform prioritization between SL transmissions and UL transmissions.

In some examples, PSFCH transmissions in a slot may have a same priority value as the smallest priority value among PSSCH receptions with corresponding HARQ-ACK information provided by the PSFCH transmissions in the slot.

In some examples, a priority of S-SS/PSBCH block transmission may be provided by an RRC parameter (e.g., sl-SSB-PriorityNR).

In some examples, a PRACH transmission, or a PUSCH scheduled by an UL grant in a RAR, may have higher priority than a PSFCH or a S-SS/PSBCH block transmission.

In some examples, a PUCCH transmission with a sidelink HARQ-ACK information report may have higher priority than a SL transmission if a priority value of the PUCCH is smaller than a priority value of the SL transmission. If the priority value of the PUCCH transmission is larger than the priority value of the SL transmission, the SL transmission may have higher priority.

In some examples, when one or more SL transmissions from a UE overlap in time with multiple non-overlapping UL transmissions from the UE, the UE may perform the SL transmissions if at least one SL transmission is prioritized over all UL transmissions subject to the UE processing timeline with respect to the first SL transmission and the first UL transmission.

In some examples, when one or more UL transmissions from a UE overlap in time with multiple non-overlapping SL transmissions, the UE may perform the UL transmissions if at least one UL transmission is prioritized over all SL transmissions subject to the UE processing timeline with respect to the first SL transmission and the first UL transmission.

In some examples, when one SL transmission overlaps in time with one or more overlapping UL transmissions, the UE may perform the SL transmission if the SL transmission is prioritized over all UL transmissions subject to both the UE multiplexing and processing timelines with respect to the first SL transmission and the first UL transmission, where the UE processing timeline with respect to the first SL transmission and the first UL transmission is same as when one or more SL transmissions overlap in time with multiple non-overlapping UL transmissions.

In some examples, when one SL transmission overlaps in time with one or more overlapping UL transmissions, the UE may perform the UL transmission if at least one UL transmission is prioritized over the SL transmission subject to both the UE multiplexing and processing timelines with respect to the first SL transmission and the first UL transmission, where the UE processing timeline with respect to the first SL transmission and the first UL transmission may be the same as when one or more SL transmissions overlap in time with multiple non-overlapping UL transmissions.

In some examples, the IE SL-BWP-Config may be used to configure NR sidelink communication on a sidelink bandwidth part. A parameter sl-BWP-Generic field may indicate the generic parameters on the configured sidelink BWP. In some examples, a sl-BWP-PoolConfig field may indicate the resource pool configurations on the configured sidelink BWP. In some examples, a sl-LengthSymbols field may indicate the number of symbols used for sidelink in a slot without SL-SSB. A single value may be (pre)configured per sidelink bandwidth part. In some examples, a sl-StartSymbol field may indicate the starting symbol used for sidelink in a slot without SL-SSB. A single value may be (pre)configured per sidelink bandwidth part. In some examples, a sl-TxDirectCurrentLocation parameter may indicate the sidelink Tx/Rx Direct Current location for the carrier.

In some examples, the IE SL-BWP-ConfigCommon may be used to configure the cell-specific configuration information on a sidelink bandwidth part. In some examples, a genericParameters field may indicate the generic parameters on the configured sidelink BWP. A sl-BWP-PoolConfigCommon field may indicate the resource pool configurations on the configured sidelink BWP.

In some examples, an IE SL-BWP-PoolConfig may be used to configure NR sidelink communication resource pool. A parameter sl-RxPool may indicate the receiving resource pool on the configured BWP. For the PSFCH related configuration, if configured, will be used for PSFCH transmission/reception. A parameter sl-TxPoolExceptional may indicate the resources by which the UE may be allowed to transmit NR sidelink communication in exceptional conditions on the configured BWP. A parameter sl-TxPoolScheduling may indicate the resources by which the UE is allowed to transmit NR sidelink communication based on network scheduling on the configured BWP. A parameter sl-TxPoolSelectedNormal may indicate the resources by which the UE is allowed to transmit NR sidelink communication by UE autonomous resource selection on the configured BWP.

In some examples, the IE SL-BWP-PoolConfigCommon may be used to configure the cell-specific NR sidelink communication resource pool.

The existing physical layer procedures and duplexing solutions are based on independent uplink and downlink transmissions and independent links for uplink and downlink directions. From the perspective of the UE, the uplink may be associated with the transmission by the UE to the base station and the downlink may be associated with the transmission from the base station to the UE. The transmissions in the uplink and the downlink directions may be handled independently and may be optimized based on the bandwidth requirements. In existing solutions for sidelink transmissions, the handling of the transmit and the receive paths may not be independent and the transmission and reception may be intertwined. The sidelink may not be optimized independently for the transmit and receive paths. Example embodiments enhance the sidelink communications and may enable independent optimization of the transmit and receive paths for the sidelink.

In existing solutions, sidelink communication may be handled in the same way for transmit and receive paths leading to an underperforming network or to vastly wasted bandwidth. Example embodiments enable the adaptation of the bandwidth of the sidelink based on the required throughput independent for the transmit and the receive path. The enhancement may lead to a better utilized overall system.

In an example embodiment, a UE may receive (e.g., using semi-static signaling or dynamic signaling) parameters indicating first radio resources for transmit and second radio resources for the receive path on a sidelink. The resources may be distinguished between the receive and transmit paths for an optimal adaptation of the needs. The UE may determine (e.g., based on the received semi-static or dynamic parameters) bandwidth/radio resources for the transmit and receive paths of the sidelink. The transmission and reception over the sidelink may be based on the determined radio resources for the transmission and reception.

In some embodiments, two independent sidelinks may be defined, e.g., a transmit sidelink and an independent receive sidelink. The transmit and receive sidelinks may be configured and assigned resources independent of each other. In some embodiments, resource allocation optimization may be achieved based on the required bandwidth in either direction. In some examples, the sidelink may be viewed as an extension of either the downlink or the uplink. In some embodiments, the required bandwidth for the transmit and receive portion of the sidelink may be determined. A first transmit sidelink may be established, based on the required transmit bandwidth. A second receive sidelink may be established based on the required receive bandwidth. The two sidelinks may be independent of each other and may be optimized according to the receive and transmit requirements.

Figure 16:
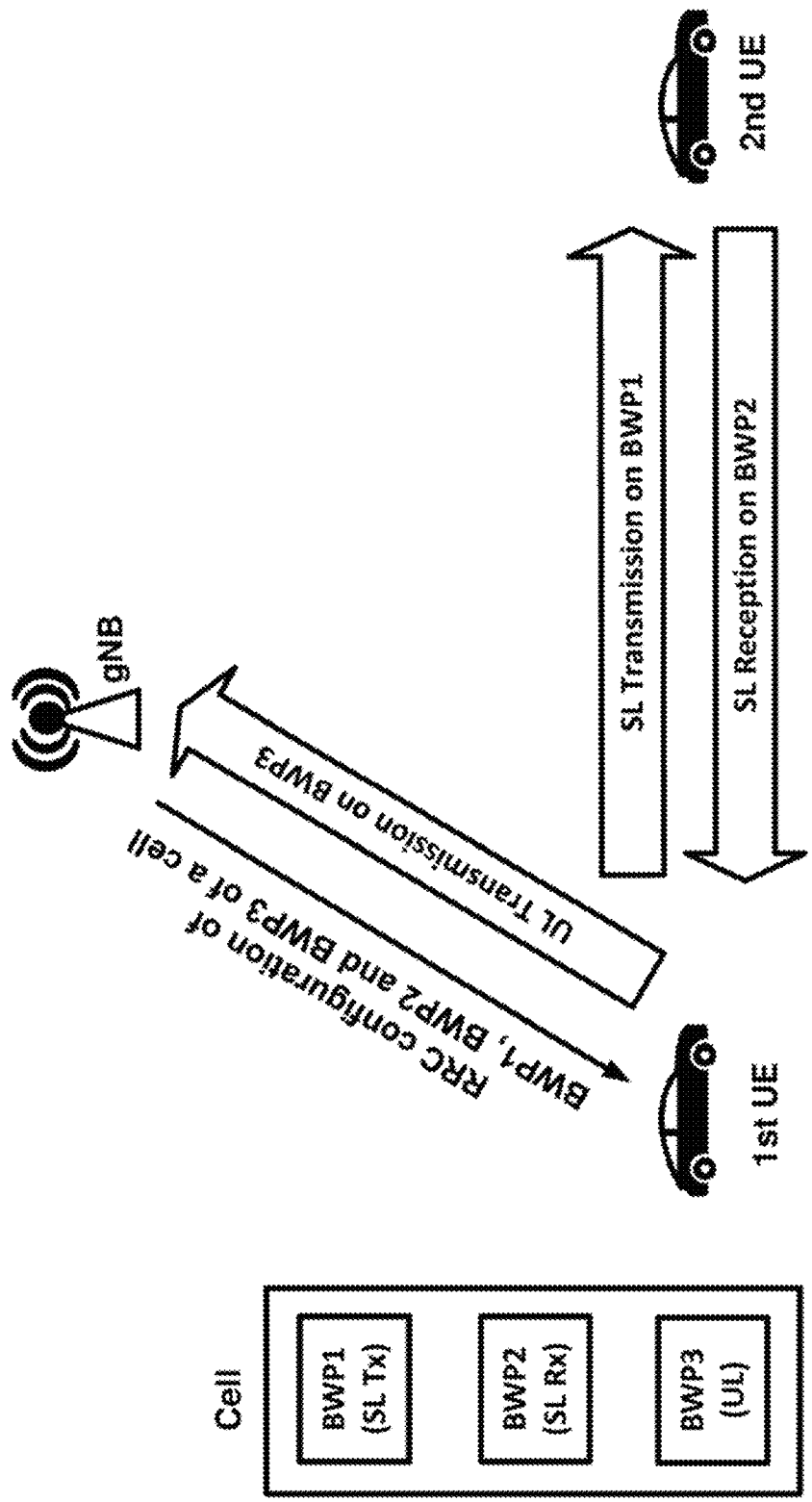
FIG. 16 shows an example process according to some aspects of some of various exemplary embodiments of the present disclosure.
Figure 18:
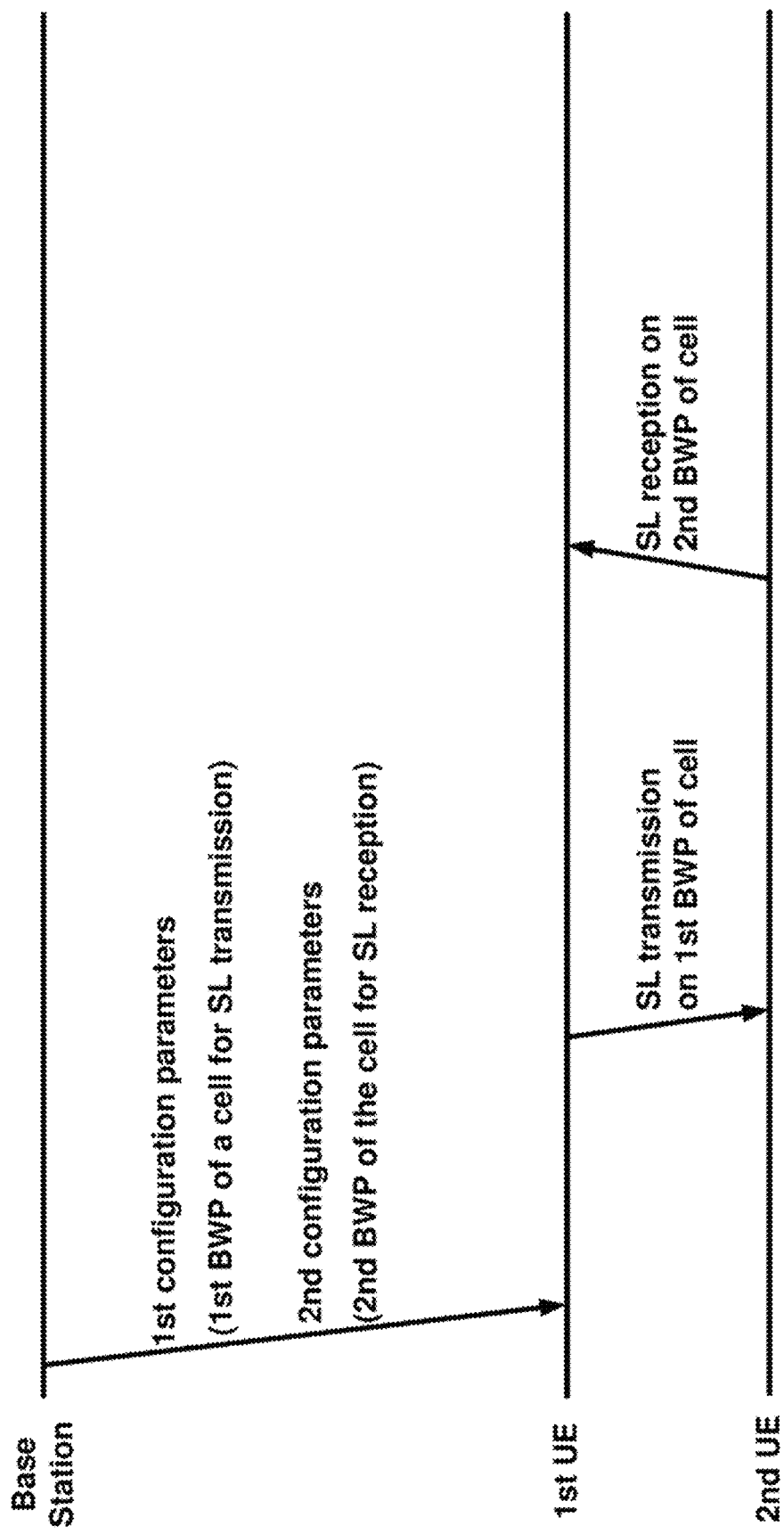
FIG. 18 shows an example process according to some aspects of some of various exemplary embodiments of the present disclosure.

In an example embodiment as shown in FIG. 16 and FIG. 18, a first UE may receive one or more messages (e.g., one or more RRC messages) comprising configuration parameters of a cell. In an example, the cell may be in a frequency band associated with sidelink communications. The configuration parameters may comprise sidelink configuration parameters for sidelink communications of the first UE with a second UE. The configuration parameters may comprise parameters for a plurality of bandwidth parts (BWPs) of the cell. The configuration parameters may comprise first configuration parameters of a first BWP of the cell and second configuration parameters of a second BWP of the cell. The first BWP of the cell may be used by the first UE for sidelink transmissions (e.g., transmission of one or more first sidelink signals and channels) to the second UE. The second BWP of the cell may be used by the first UE for sidelink receptions (e.g., reception of one or more second sidelink signals and channels) from the second UE. In an example as shown in FIG. 17, the first configuration parameters of the first BWP or the second configuration parameters of the second BWP may comprise a parameter indicating a direction of the BWP (e.g., indicating whether the BWP is used for transmitting or receiving the sidelink signals or channels). The one or more first signals/channels or the one or more second signals/channels may comprise one or more of the PSSCH, PSCCH, PSFCH, S-PSS or S-SSS or other signals/channels. The first BWP may be associated with a first numerology and first radio resources. The first configuration parameters may indicate the first numerology and the first radio resources. The first configuration parameters may indicate frequency domain and location of the first BWP. For example, the first numerology may indicate a first subcarrier spacing and a first symbol/slot duration. The second BWP may be associated with a second numerology and second radio resources. The second configuration parameters may indicate the second numerology and the second radio resources. The second configuration parameters may indicate frequency domain and location of the second BWP. For example, the second numerology may indicate a second subcarrier spacing and a second symbol/slot duration. In some examples, the first numerology may be different from the second numerology. In some examples, the first BWP and the second BWP may have zero overlap.

Based on the first configuration parameters and via the first BWP of the cell, the first UE may transmit the one or more first sidelink signals and channels to the second UE. Based on the second configuration parameters and via the second BWP of the cell, the first UE may receive the one or more second sidelink signals and channels from the second UE.

In some examples, the UE may receive third configuration parameters of a third BWP of the cell for uplink transmissions to the base station. The third configuration parameters may indicate a third numerology for the third BWP. In some examples, the UE may expect that the third numerology is the same as the first numerology. In some example, the UE may expect that the numerology of the third BWP for uplink transmissions and the numerology of the first BWP for sidelink transmissions are different from the numerology of the second BWP for receiving sidelink transmissions (e.g., from the second UE).

In some examples, the first UE may transmit a capability message indicating wireless device capabilities in terms of transmission/reception capabilities or other physical or RF capabilities. The capability message may comprise a capability information element (IE) indicating that the wireless device is capable of transmitting and receiving sidelink communications using different BWPs of the cell. The base station may determine that the wireless device is capable of transmitting and receiving sidelink communications using different BWPs of a sidelink cell and in response to receiving the capability message/IE and the determination, the base station may transmit to the first UE, the configuration parameters of different BWPs of the cell for transmitting and receiving sidelink communications.

In some examples, the first UE may transmit a capability message indicating wireless device capabilities in terms of transmission/reception capabilities or other physical or RF capabilities. The capability message may comprise a capability information element (IE) indicating that the wireless device is capable of transmitting sidelink communications via multiple bandwidth parts (BWPs) of a cell. The base station may determine that the wireless device is capable of transmitting sidelink communications using multiple BWPs of a sidelink cell and in response to receiving the capability message/IE and the determination, the base station may transmit to the first UE, the configuration parameters of a third BWP of the cell for transmission of third sidelink signals and channels.

In some examples, the first UE may further receive third configuration parameters of a third BWP of the cell for transmission of one or more third sidelink signals and channels by the first UE to a third UE. The transmission of the one or more first signals and channels via the first BWP of the cell (e.g., to the first UE) may be associated with a first priority and the transmission of the one or more third signals or channels via the third BWP of the cell (e.g., to the third UE) may be associated with a second priority. In some examples, the configuration parameters (e.g., RRC parameters) may comprise a first priority parameter, indicating the first priority, and a second priority parameter indicating the second priority. For example as shown in FIG. 17, an information element comprising the configuration parameters of the sidelink may comprise a priority parameter indicating a priority. For example, the priority parameter may be an integer and the larger the integer is the higher may be the priority of the BWP. For example, the priority parameter may be an integer and the smaller the integer is the higher may be the priority of the BWP. In some examples, the first UE may receive the first priority and the second priority in response to the first UE not being capable of transmitting (e.g., simultaneously) sidelink communications via multiple BWPs of the cell. In some examples, the first UE may utilize the first priority parameter and the second priority parameter to select one of first transmission of one or more first signals and channels via the first BWP and second transmission of one or more third signals and channels via the third BWP. The selection between the first transmission and the second transmission may be based on the first transmission and the second transmission being scheduled for transmission at the same time.

In some examples, the first UE may receive a scheduling DCI scheduling transmission of sidelink signals and channels via a BWP of a cell. For example, the DCI may comprise a field for a BWP identifier, a value of the field indicating one of the first BWP or the third BWP. The DCI may comprise scheduling information for a sidelink signal or channel. The first UE may transmit the sidelink signal or channel using the scheduling information and via the BWP indicated by the DCI, e.g., one of the first BWP and the third BWP.

In some examples, transmission via the first BWP and the reception via the second BWP may not occur simultaneously, for example, based on the first UE capabilities. In some examples, to avoid simultaneous transmission via the first BWP and the reception via the second BWP, the configuration parameters may indicate a first time pattern for transmissions via the first BWP and receptions via the second BWP.

In some examples, the first UE may determine the first time pattern based on a first bitmap and the second time pattern based on the second bitmap. For example, the first UE may receive information elements indicating the first bitmap and the second bitmap. A bit in a bitmap may be associated with a symbol/slot/subframe and a value of the bit may indicate whether a symbol/slot/subframe may be used for transmission of a sidelink signal/channel or whether a symbol/slot/subframe may be used for reception of a sidelink signal/channel.

In some examples, the first UE may determine the first time pattern based on a first periodicity and the first UE may determine the second time pattern based on a second periodicity. The configuration parameters may indicate the first periodicity and the second periodicity.

In some examples, the first UE may determine a time pattern based on a start symbol parameter and a length parameter. For example, the first UE may determine the timing of a sidelink transmission (e.g., the symbols used for transmission of a sidelink signal/channels) using the start symbol parameter and the length parameter.

Figure 19:
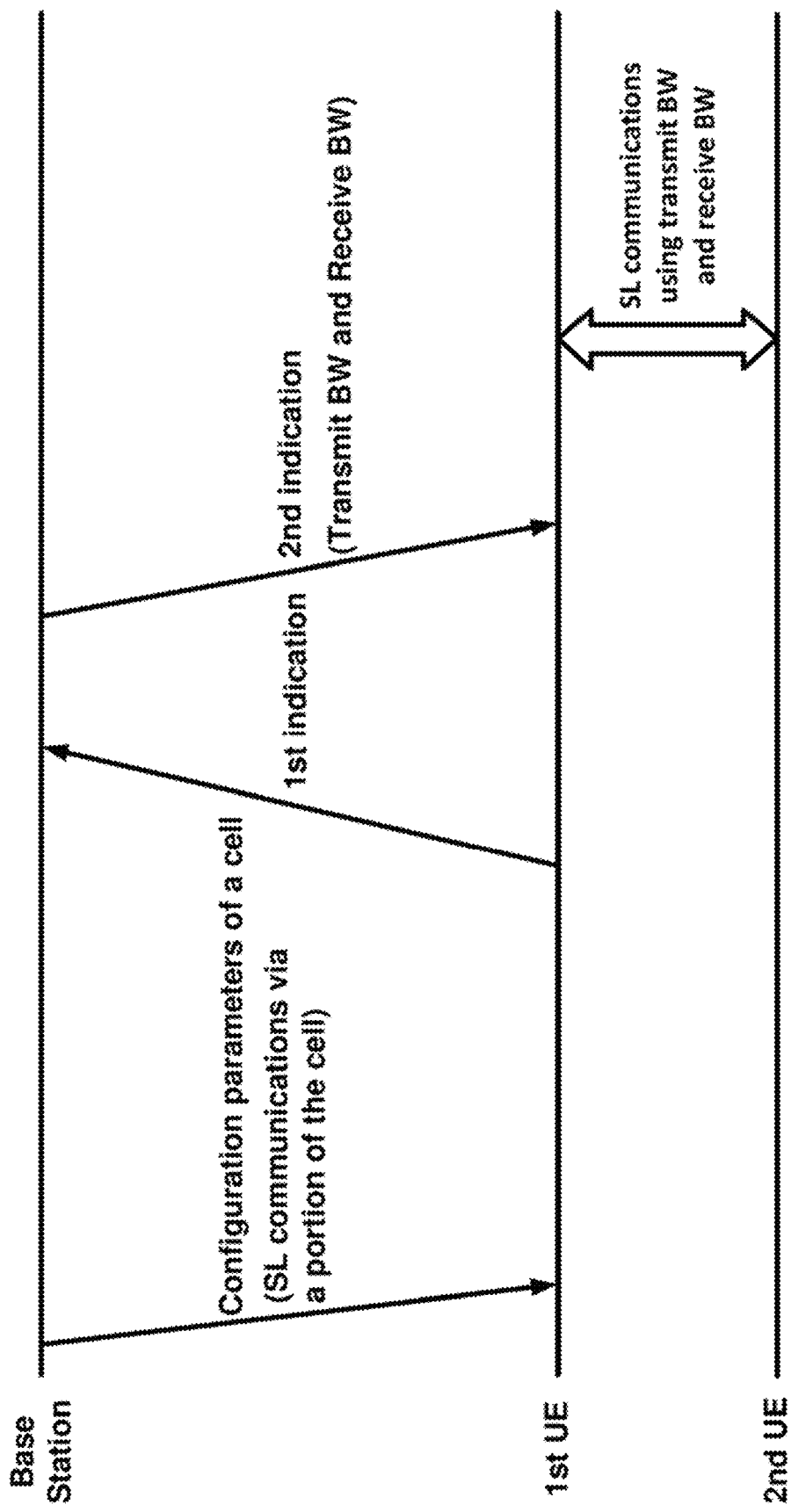
FIG. 19 shows an example process according to some aspects of some of various exemplary embodiments of the present disclosure.

In an example embodiment as shown in FIG. 19, a first UE may receive one or more messages (e.g., one or more RRC messages) comprising configuration parameters of a cell for sidelink communications on the cell. The configuration parameters may be for sidelink communications via at least a portion of the bandwidth of the cell (e.g., a BWP of the cell). The configuration parameters may be for sidelink communications with a second UE. The first UE may transmit a first indication (e.g., via an RRC message and/or a MAC CE transmitted by PUSCH or via uplink control information via PUCCH) to the base station, wherein the first indication may indicate a required bandwidth/resource allocation/resource blocks for sidelink communications via the cell (e.g., via the portion of the bandwidth of the cell). In some examples, the first UE may determine to transmit the first indication based on sidelink data availability (e.g., the amount of data in buffers associated with the sidelink logical channels). The first UE may receive from the base station and based on the required bandwidth, a second indication (e.g., via an RRC message and/or a MAC CE received by PDSCH or via downlink control information via PDCCH) indicating transmit bandwidth and receive bandwidth for sidelink transmission/reception via the sidelink or a ratio of a transmit bandwidth to a receive bandwidth of the sidelink. The first UE may transmit the sidelink signals/channel using the transmit bandwidth and may receive the sidelink signals/channel using the receive bandwidth based on the transmit/receive bandwidths indicated by the second indication from the base station.

In an embodiment, a first user equipment (UE) may receive from a base station, configuration parameters, of a cell for sidelink communications with a second UE, comprising: first configuration parameters of a first bandwidth part (BWP) of the cell for transmission of one or more first sidelink signals and channels by the first UE to the second UE; and second configuration parameters of a second BWP of the cell for reception of one or more second sidelink signals and channels by the first UE from the second UE. The first configuration parameters may indicate first radio resources of the cell and a first numerology for the first BWP. The second configuration parameters may indicate second radio resources of the cell and a second numerology for the second BWP. The first UE may transmit to the second UE, the one or more first sidelink signals and channels via the first BWP and based on the first configuration parameters. The first UE may receive from the second UE, the one or more second sidelink signals and channels via the second BWP and based on the second configuration parameters.

In some embodiments, the first UE may receive from the base station, third configuration parameters of a third bandwidth part (BWP) of the cell for uplink transmissions to the base station. In some embodiments, the third configuration parameters may indicate a third numerology for the third bandwidth part (BWP). The first UE may expect that the third numerology is equal to the first numerology.

In some embodiments, the cell may be in a frequency band associated with sidelink communications.

In some embodiments, the one or more first signals and channels comprise one or more of: a first physical sidelink shared channel (PSSCH); a first physical sidelink control channel (PSCCH); a first physical sidelink feedback channel (PSFCH); a first sidelink primary synchronization signal (S-PSS); and a first sidelink secondary synchronization channel (S-SSS).

In some embodiments, the one or more second signals and channels comprise one or more of: a second physical sidelink shared channel (PSSCH); a second physical sidelink control channel (PSCCH); a second physical sidelink feedback channel (PSSCH); a second sidelink primary synchronization signal (S-PSS); and a second sidelink secondary synchronization channel (S-SSS).

In some embodiments, the first configuration parameters may indicate a first frequency domain location and a first bandwidth of the first bandwidth part. The second configuration parameters may indicate a second frequency domain location and a second bandwidth of the second bandwidth part.

In some embodiments, the first configuration parameters indicate a first subcarrier spacing and a first symbol duration of the first bandwidth part. The second configuration parameters indicate a second subcarrier spacing and a second symbol duration of the second bandwidth part.

In some embodiments, the first UE may transmit to the base station, a capability message comprising an information element indicating that the wireless device is capable of transmitting and receiving sidelink communications using different bandwidth parts (BWPs) of a cell. Receiving the configuration parameters may be in response to transmitting the capability message.

In some embodiments, the first UE may transmit to the base station, a capability message comprising an information element indicating that the wireless device is capable of transmitting sidelink communications via multiple bandwidth parts (BWPs) of a cell. In response to transmitting the capability message, the first UE may receive third configuration parameters of a third BWP of the cell for transmission of one or more third sidelink signals and channels by the first UE to a third UE.

In some embodiments, the first UE may receive third configuration parameters of a third bandwidth part (BWP) of the cell for transmission of one or more third sidelink signals and channels by the first UE to a third UE. The transmission of the one or more first sidelink signals and channels via the first BWP may be associated with a first priority. The transmission of the one or more third sidelink signals and channels via the third BWP may be associated with a second priority. In some embodiments, the first configuration parameters may comprise a first priority parameter indicating the first priority. The third configuration parameters may comprise a second priority parameter indicating the second priority. In some embodiments, the first UE may select, based on the first priority and the second priority, one of: first transmission of a first sidelink signal or sidelink channel via the first BWP; and second transmission of a third sidelink signal or sidelink channels via the third BWP. In some embodiments, selecting one of the first transmission or the second transmission may be based on the first UE not being capable of simultaneously transmitting the first transmission and the second transmission.

In some embodiments, the first UE may receive third configuration parameters of a third bandwidth part (BWP) of the cell for transmission of one or more third sidelink signals and channels by the first UE to a third UE. The first UE may receive a downlink control information, comprising: a field indicating one of the first BWP or the third BWP; and scheduling information for a sidelink signal or channel. The first UE may transmit the sidelink signal or channel via one of the first BWP or the third BWP indicated by the downlink control information.

In some embodiments, the first UE may transmit the one or more first sidelink signals and channels may be based on a first time pattern. The first UE may receive the one or more second sidelink signals and channels may be based on a second time pattern. In some embodiments, the first configuration parameters may indicate the first time pattern. The second configuration parameters may indicate the second time pattern. In some embodiments, the first time pattern and the second time pattern may be configured to avoid simultaneous transmission on the first bandwidth part (BWP) and reception on the second BWP.

In some embodiments, the first time pattern may be based on a first bitmap, a value of a first bit in the first bitmap may indicate whether a first symbol corresponding to the first bit can be used for transmission of the one or more first sidelink signals and channels. The second time pattern may be based on a second bitmap, a value of a second bit in the second bitmap may indicate whether a second symbol corresponding to the second bit can be used for reception of the one or more second sidelink signals and channels. The first configuration parameters may indicate the first bitmap. The second configuration parameters may indicate the second bitmap.

In some embodiments, the first time pattern may be based on a first periodicity. The second time pattern may be based on a second periodicity. The first configuration parameters indicate the first periodicity. The second configuration parameters may indicate the second periodicity.

In some embodiments, the first time pattern may be based on a first start symbol parameter and a first length parameter. The second time pattern may be based on a second start symbol parameter and a second length parameter. The first configuration parameters may indicate the first start symbol parameter and the first length parameter. The second configuration parameters may indicate the second start symbol parameter and the second length parameter.

In an embodiment, a first user equipment (UE) may receive from a base station, configuration parameters of a cell for sidelink communications, via at least a portion of bandwidth the cell, with a second UE. The first UE may transmit to the base station a first indication indicating a required bandwidth for transmission of sidelink data via the cell. The first UE may receive from the base station and based on the required bandwidth, a second indication indicating a ratio of a transmit bandwidth to a receive bandwidth, wherein: the transmit bandwidth may be for sidelink transmissions by the first UE and via the cell; and the receive bandwidth may be for sidelink receptions by the first UE and via the cell.

In some embodiments, the portion of bandwidth of the cell may be a bandwidth part (BWP) of the cell.

In some embodiments, transmitting the first indication may be via one or more radio resource control (RRC) messages.

In some embodiments, the first indication may be a medium access control (MAC) control element (CE); and transmitting the MAC CE may be via a physical uplink shared channel (PUSCH).

In some embodiments, the first indication may be an uplink control information; and transmitting the uplink control information may be via an uplink control channel.

In some embodiments, receiving the second indication may be via one or more radio resource control (RRC) messages.

In some embodiments, the second indication may be a medium access control (MAC) control element (CE); and receiving the MAC CE may be via a physical downlink shared channel (PDSCH).

In some embodiments, the second indication may be a downlink control information; and receiving the downlink control information is via a downlink control channel.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc.

A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method for sidelink wireless communications comprising:
receiving, by a first user equipment (UE), configuration parameters, of a cell for sidelink communications with a second UE, comprising:
first configuration parameters of a first bandwidth part (BWP) of the cell for transmission of one or more first sidelink signals and channels by the first UE to the second UE; and
second configuration parameters of a second BWP of the cell for reception of one or more second sidelink signals and channels by the first UE from the second UE; and
wherein:
the first configuration parameters indicate first radio resources of the cell and a first numerology for the first BWP; and
the second configuration parameters indicate second radio resources of the cell and a second numerology for the second BWP;
transmitting, by the first UE, the one or more first sidelink signals and channels via the first BWP and based on the first configuration parameters; and
receiving, by the first UE, the one or more second sidelink signals and channels via the second BWP and based on the second configuration parameters.

Clause 2. The method of Clause 1 further comprising receiving, by the first user equipment (UE), third configuration parameters of a third bandwidth part (BWP) of the cell for uplink transmissions to the base station.

Clause 3. The method of Clause 2, wherein:
the third configuration parameters define a third numerology for the third bandwidth part (BWP); and
the first user equipment (UE) expects that the third numerology is equal to the first numerology.

Clause 4. The method of Clause 1, wherein the cell is in a frequency band associated with sidelink communications.

Clause 5. The method of Clause 1, wherein the one or more first signals and channels comprise one or more of:
a first physical sidelink shared channel (PSSCH);
a first physical sidelink control channel (PSCCH);
a first physical sidelink feedback channel (PSFCH);
a first sidelink primary synchronization signal (S-PSS); and
a first sidelink secondary synchronization channel (S-SSS).

Clause 6. The method of Clause 1, wherein the one or more second signals and channels comprise one or more of:
a second physical sidelink shared channel (PSSCH);
a second physical sidelink control channel (PSCCH);
a second physical sidelink feedback channel (PSSCH);
a second sidelink primary synchronization signal (S-PSS); and
a second sidelink secondary synchronization channel (S-SSS).

Clause 7. The method of Clause 1, wherein:
the first configuration parameters define a first frequency domain location and a first bandwidth of the first bandwidth part; and
the second configuration parameters define a second frequency domain location and a second bandwidth of the second bandwidth part.

Clause 8. The method of Clause 1, wherein:
the first configuration parameters define a first subcarrier spacing and a first symbol duration of the first bandwidth part; and
the second configuration parameters define a second subcarrier spacing and a second symbol duration of the second bandwidth part.

Clause 9. The method of Clause 1 further comprising:
transmitting, by the first user equipment (UE) to the base station, a capability message comprising an information element indicating that the wireless device is capable of transmitting and receiving sidelink communications using different bandwidth parts (BWPs) of a cell; and
wherein, the configuration parameters are received by the first UE, from the base station, in response to the first UE transmitting the capability message.

Clause 10. The method of Clause 1 further comprising:
transmitting, by the first user equipment (UE) to the base station, a capability message comprising an information element indicating that the wireless device is capable of transmitting sidelink communications via multiple bandwidth parts (BWPs) of a cell; and
in response to the first UE transmitting the capability message, the first UE receiving third configuration parameters of a third BWP of the cell for transmission of one or more third sidelink signals and channels by the first UE to a third UE.

Clause 11. The method of Clause 1 further comprising:
receiving third configuration parameters of a third bandwidth part (BWP) of the cell for transmission of one or more third sidelink signals and channels by the first user equipment (UE) to a third UE; and
wherein:
transmission of the one or more first sidelink signals and channels via the first BWP is associated with a first priority; and
transmission of the one or more third sidelink signals and channels via the third BWP is associated with a second priority.

Clause 12. The method of Clause 11, wherein:
the first configuration parameters comprise a first priority parameter indicating the first priority; and
the third configuration parameters comprise a second priority parameter indicating the second priority.

Clause 13. The method of Clause 11, further comprising selecting, based on the first priority and the second priority, one of:
first transmission of a first sidelink signal or sidelink channel via the first BWP; and
second transmission of a third sidelink signal or sidelink channels via the third BWP.

Clause 14. The method of Clause 13, wherein selecting one of the first transmission or the second transmission is based on the first user equipment (UE) not being capable of simultaneously transmitting the first transmission and the second transmission.

Clause 15. The method of Clause 1 further comprising:
receiving third configuration parameters of a third bandwidth part (BWP) of the cell for transmission of one or more third sidelink signals and channels by the first user equipment (UE) to a third UE;
receiving a downlink control information the downlink control information including
a field indicating one of the first BWP or the third BWP, and scheduling information for a sidelink signal or channel; and
transmitting the sidelink signal or channel via one of the first BWP or the third BWP, based at least in part, on the downlink control information.

Clause 16. The method of Clause 1, wherein:
transmitting the one or more first sidelink signals and channels includes transmitting the one or more first sidelink signals and channels based on a first time pattern; and
receiving the one or more second sidelink signals and channels includes receiving the one or more sidelink signals and channels based on a second time pattern.

Clause 17. The method of Clause 16, wherein the first time pattern and the second time pattern are configured to avoid simultaneous transmission on the first bandwidth part (BWP) and reception on the second BWP.

Clause 18. The method of Clause 16, wherein:
the first configuration parameters indicate the first time pattern; and
the second configuration parameters indicate the second time pattern.

Clause 19. The method of Clause 16, wherein the first time pattern is based on a first bitmap, wherein a value of a first bit in the first bitmap indicates whether a first symbol corresponding to the first bit can be used for transmission of the one or more first sidelink signals and channels, and wherein the first configuration parameters indicate the first bitmap.

Clause 20. The method of Clause 16, wherein the second time pattern is based on a second bitmap, and wherein a value of a second bit in the second bitmap indicates whether a second symbol corresponding to the second bit can be used for reception of the one or more second sidelink signals and channels, and wherein; and
the second configuration parameters indicate the second bitmap.

Clause 21. The method of Clause 16, wherein:
the first time pattern is based on a first periodicity and wherein the first configuration parameters include the first periodicity; and
the second time pattern is based on a second periodicity and wherein the second configuration parameters indicate the second periodicity.

Clause 22. The method of Clause 16, wherein:
the first time pattern is based on a first start symbol parameter and a first length parameter and wherein the first configuration parameters indicate the first start symbol parameter and the first length parameter; and
the second time pattern is based on a second start symbol parameter and a second length parameter and wherein the second configuration parameters indicate the second start symbol parameter and the second length parameter.

Clause 23. A method for sidelink wireless communications comprising:
receiving, by a first user equipment (UE) from a base station, configuration parameters of a cell for sidelink communications with a second UE, wherein the configuration parameters are received via at least a portion of bandwidth of the cell;
transmitting, by the first UE to the base station, first information indicative of a required bandwidth for transmission of sidelink data via the cell; and
receiving, by the first UE from the base station, second information indicative of a ratio of a transmit bandwidth to a receive bandwidth,
wherein the second information is based, at least in part, on the required bandwidth, wherein the transmit bandwidth is for sidelink transmissions by the first UE and via the cell; and wherein the receive bandwidth is for sidelink receptions by the first UE and via the cell.

Clause 24. The method of Clause 23, wherein the portion of bandwidth of the cell is a bandwidth part (BWP) of the cell.

Clause 25. The method of Clause 23, wherein transmitting the first indication is via one or more radio resource control (RRC) messages.

Clause 26. The method of Clause 23, wherein the first information indicative of a required bandwidth for transmission of sidelink data corresponds to a medium access control (MAC) control element (CE) and wherein transmitting the first information includes transmitting of the MAC CE via a physical uplink shared channel (PUSCH).

Clause 27. The method of Clause 23, wherein the first information indicative of a required bandwidth for transmission of sidelink data corresponds to uplink control information and wherein transmitting the first information includes transmitting the uplink control information via an uplink control channel.

Clause 28. The method of Clause 23, wherein receiving the second indication is via one or more radio resource control (RRC) messages.

Clause 29. The method of Clause 23, wherein the second information indicative of a ratio of a transmit bandwidth to a receive bandwidth corresponds to a medium access control (MAC) control element (CE) and wherein receiving the second information includes receiving the MAC CE via a physical downlink shared channel (PDSCH).

Clause 30. The method of Clause 23, wherein the second information indicative of a ratio of a transmit bandwidth to a receive bandwidth includes downlink control information and wherein receiving the second information includes receiving the downlink control information via a downlink control channel.

Clause 31. An apparatus for utilization in wireless communications comprising:

an antenna for use in transmission of electromagnetic signals;

a memory for maintaining computer-readable code; and a processor for executing the computer-readable code that causes the apparatus to receive from a base station, configuration parameters of a cell for sidelink communications with a second UE, wherein the configuration parameters are received via at least a portion of bandwidth of the cell;

transmit to the base station, first information indicative of a required bandwidth for transmission of sidelink data via the cell; and receive from the base station second information indicative of a ratio of a transmit bandwidth to a receive bandwidth;

wherein the second information is based, at least in part, on the required bandwidth, wherein the transmit bandwidth is for sidelink transmissions by the apparatus and via the cell; and wherein the receive bandwidth is for sidelink receptions by the apparatus and via the cell.

Clause 32. The apparatus of Clause 31, wherein the portion of bandwidth of the cell is a bandwidth part (BWP) of the cell.

Clause 33. The apparatus of Clause 31, wherein transmitting the first indication is via one or more radio resource control (RRC) messages.

Clause 34. The apparatus of Clause 31, wherein the first information indicative of a required bandwidth for transmission of sidelink data corresponds to a medium access control (MAC) control element (CE) and wherein the apparatus transmits the MAC CE via a physical uplink shared channel (PUSCH).

Clause 35. The apparatus of Clause 31, wherein the first information indicative of a required bandwidth for transmission of sidelink data corresponds to uplink control information and wherein the apparatus transmits the uplink control information via an uplink control channel.

Clause 36. The apparatus of Clause 31, wherein receiving the second indication is via one or more radio resource control (RRC) messages.

Clause 37. The apparatus of Clause 31, wherein the second information indicative of a ratio of a transmit bandwidth to a receive bandwidth corresponds to a medium access control (MAC) control element (CE) and wherein the apparatus receives the MAC CE via a physical downlink shared channel (PDSCH).

Clause 38. The apparatus of Clause 31, wherein the second information indicative of a ratio of a transmit bandwidth to a receive bandwidth includes downlink control information and wherein receiving the second information includes receiving the downlink control information via a downlink control channel.

Clause 39. A method for sidelink wireless communications comprising:

transmitting, by a base station, configuration parameters of a cell for sidelink communications between a first UE and a second UE, wherein the configuration parameters are received via at least a portion of bandwidth of the cell;

receiving, by the base station, first information indicative of a required bandwidth for transmission of sidelink data via the cell; and transmitting, by the base station, second information indicative of a ratio of a transmit bandwidth to a receive bandwidth, wherein the second information is based, at least in part, on the required bandwidth, wherein the transmit bandwidth is for sidelink transmissions by the first UE and via the cell; and wherein the receive bandwidth is for sidelink receptions by the first UE and via the cell.

Clause 40. The method of Clause 39, wherein the portion of bandwidth of the cell is a bandwidth part (BWP) of the cell.

Clause 41. The method of Clause 39, wherein receiving the first indication is via one or more radio resource control (RRC) messages.

Clause 42. The method of Clause 39, wherein the first information indicative of a required bandwidth for transmission of sidelink data corresponds to a medium access control (MAC) control element (CE) and wherein receiving the first information includes receiving of the MAC CE via a physical uplink shared channel (PUSCH).

Clause 43. The method of Clause 39, wherein the first information indicative of a required bandwidth for transmission of sidelink data corresponds to uplink control information and wherein receiving the first information includes receiving the uplink control information via an uplink control channel.

Clause 44. The method of Clause 39, wherein transmitting the second indication is via one or more radio resource control (RRC) messages.

Clause 45. The method of Clause 39, wherein the second information indicative of a ratio of a transmit bandwidth to a receive bandwidth corresponds to a medium access control (MAC) control element (CE) and wherein transmitting the second information includes transmitting the MAC CE via a physical downlink shared channel (PDSCH).

Clause 46. The method of Clause 39, wherein the second information indicative of a ratio of a transmit bandwidth to a receive bandwidth includes downlink control information and wherein transmitting the second information includes
transmitting the downlink control information via a downlink control channel.

Clause 47. An apparatus for utilization in wireless communications comprising:
an antenna for use in transmission of electromagnetic signals;
a memory for maintaining computer-readable code; and
a processor for executing the computer-readable code that causes the apparatus to
transmit configuration parameters of a cell for sidelink communications between a first UE and a second UE, wherein the configuration parameters are received via at least a portion of bandwidth of the cell;
receive first information indicative of a required bandwidth for transmission of sidelink data via the cell; and
transmit second information indicative of a ratio of a transmit bandwidth to a receive bandwidth,
wherein the second information is based, at least in part, on the required bandwidth, wherein the transmit bandwidth is for sidelink transmissions by the first UE and via the cell; and wherein the receive bandwidth is for sidelink receptions by the first UE and via the cell.

Clause 48. The apparatus of Clause 47, wherein the portion of bandwidth of the cell is a bandwidth part (BWP) of the cell.

Clause 49. The apparatus of Clause 47, wherein receiving the first indication is via one or more radio resource control (RRC) messages.

Clause 50. The apparatus of Clause 47, wherein the first information indicative of a required bandwidth for transmission of sidelink data corresponds to a medium access control (MAC) control element (CE) and wherein the apparatus receives the MAC CE via a physical uplink shared channel (PUSCH).

Clause 51. The apparatus of Clause 47, wherein the first information indicative of a required bandwidth for transmission of sidelink data corresponds to uplink control information and wherein the apparatus receives the uplink control information via an uplink control channel.

Clause 52. The apparatus of Clause 47, wherein transmitting the second indication is via one or more radio resource control (RRC) messages.

Clause 53. The apparatus of Clause 47, wherein the second information indicative of a ratio of a transmit bandwidth to a receive bandwidth corresponds to a medium access control (MAC) control element (CE) and wherein the apparatus transmits the MAC CE via a physical downlink shared channel (PDSCH).

Clause 54. The apparatus of Clause 47, wherein the second information indicative of a ratio of a transmit bandwidth to a receive bandwidth includes downlink control information and wherein the apparatus transmits the downlink control information via a downlink control channel.

The invention claimed is:

1. A method for sidelink wireless communications comprising:
receiving, by a first user equipment (UE), configuration parameters, of a cell for sidelink communications with a second UE, the configuration parameters comprising:
first configuration parameters of a first bandwidth part (BWP) of the cell for transmission of one or more first sidelink signals and channels by the first UE to the second UE; and
second configuration parameters of a second BWP of the cell for reception of one or more second sidelink signals and channels by the first UE from the second UE,
wherein:
the first configuration parameters indicate first radio resources of the cell and a first numerology for the first BWP of the cell for the transmission of the one or more first sidelink signals; and
the second configuration parameters indicate second radio resources of the cell and a second numerology for the second BWP of the cell for the transmission of the one or more second sidelink signals;
transmitting, by the first UE, the one or more first sidelink signals and channels via the first BWP and based on the first configuration parameters; and
receiving, by the first UE, the one or more second sidelink signals and channels via the second BWP and based on the second configuration parameters.

2. The method of claim 1 further comprising receiving, by the first UE, third configuration parameters of a third BWP of the cell for uplink transmissions to a base station.

3. The method of claim 2, wherein:
the third configuration parameters define a third numerology for the third BWP; and
the first UE expects that the third numerology is equal to the first numerology.

4. The method of claim 1, wherein the cell is in a frequency band associated with the sidelink communications.

5. The method of claim 1, wherein the one or more first signals and channels comprise one or more of:
a first physical sidelink shared channel (PSSCH);
a first physical sidelink control channel (PSCCH);
a first physical sidelink feedback channel (PSFCH);
a first sidelink primary synchronization signal (S-PSS); and
a first sidelink secondary synchronization signal (S-SSS).

6. The method of claim 1, wherein the one or more second signals and channels comprise one or more of:
a second PSSCH;
a second PSCCH;
a second PSFCH;
a second S-PSS; and
a second S-SSS.

7. The method of claim 1, wherein:
the first configuration parameters define a first frequency domain location and a first bandwidth of the first BWP; and
the second configuration parameters define a second frequency domain location and a second bandwidth of the second BWP.

8. The method of claim 1, wherein:
the first configuration parameters define a first subcarrier spacing and a first symbol duration of the first BWP; and
the second configuration parameters define a second subcarrier spacing and a second symbol duration of the second BWP.

9. The method of claim 1 further comprising:
transmitting, by the first UE to a base station, a capability message comprising an information element indicating that the first UE is capable of transmitting and receiving sidelink communications using different bandwidth parts (BWPs) of a cell, wherein the configuration parameters are received by the first UE, from the base station, in response to the first UE transmitting the capability message.

10. The method of claim 1 further comprising:

transmitting, by the first UE to a base station, a capability message comprising an information element indicating that the first UE is capable of transmitting sidelink communications via multiple BWPs of a cell; and in response to transmitting the capability message, receiving, by the first UE, third configuration parameters of a third BWP of the cell for transmission of one or more third sidelink signals and channels to a third UE.

11. The method of claim 1 further comprising:

receiving third configuration parameters of a third BWP of the cell for transmission of one or more third sidelink signals and channels by the first UE to a third UE, wherein:

transmission of the one or more first sidelink signals and channels via the first BWP is associated with a first priority; and transmission of the one or more third sidelink signals and channels via the third BWP is associated with a second priority.

12. The method of claim 11, wherein:

the first configuration parameters comprise a first priority parameter indicating the first priority; and the third configuration parameters comprise a second priority parameter indicating the second priority.

13. The method of claim 11, further comprising selecting, based on the first priority and the second priority, one of:

first transmission of a first sidelink signal or sidelink channel via the first BWP; and second transmission of a third sidelink signal or sidelink channels via the third BWP.

14. The method of claim 13, wherein selecting one of the first transmission or the second transmission is based on the first UE not being capable of simultaneously transmitting the first transmission and the second transmission.

15. The method of claim 1 further comprising:

receiving third configuration parameters of a third BWP of the cell for transmission of one or more third sidelink signals and channels by the first UE to a third UE;

receiving a downlink control information, the downlink control information including a field indicating one of the first BWP or the third BWP, and scheduling information for a sidelink signal or channel; and transmitting the sidelink signal or channel via one of the first BWP or the third BWP, based at least in part, on the downlink control information.

16. The method of claim 1, wherein:

transmitting the one or more first sidelink signals and channels includes transmitting the one or more first sidelink signals and channels based on a first time pattern; and receiving the one or more second sidelink signals and channels includes receiving the one or more second sidelink signals and channels based on a second time pattern.

17. The method of claim 16, wherein the first time pattern and the second time pattern are configured to avoid simultaneous transmission on the first BWP and reception on the second BWP.

18. The method of claim 16, wherein:

the first configuration parameters indicate the first time pattern; and the second configuration parameters indicate the second time pattern.

19. The method of claim 16, wherein the first time pattern is based on a first bitmap, wherein a value of a first bit in the first bitmap indicates whether a first symbol corresponding to the first bit can be used for transmission of the one or more first sidelink signals and channels, and wherein the first configuration parameters indicate the first bitmap.

20. The method of claim 16, wherein the second time pattern is based on a second bitmap, and wherein a value of a second bit in the second bitmap indicates whether a second symbol corresponding to the second bit can be used for reception of the one or more second sidelink signals and channels, and the second configuration parameters indicate the second bitmap.

21. The method of claim 16, wherein:

the first time pattern is based on a first periodicity and wherein the first configuration parameters include the first periodicity; and the second time pattern is based on a second periodicity and wherein the second configuration parameters indicate the second periodicity.

22. The method of claim 16, wherein:

the first time pattern is based on a first start symbol parameter and a first length parameter and wherein the first configuration parameters indicate the first start symbol parameter and the first length parameter; and the second time pattern is based on a second start symbol parameter and a second length parameter and wherein the second configuration parameters indicate the second start symbol parameter and the second length parameter.

* * * * *